(12) United States Patent
Kim et al.

(10) Patent No.: US 9,342,729 B2
(45) Date of Patent: May 17, 2016

(54) FAKE FINGERPRINT DETECTION SYSTEM

(71) Applicant: SecuGen Corporation, Santa Clara, CA (US)

(72) Inventors: Young-Jae Kim, Cupertino, CA (US);
Dong Won Lee, San Jose, CA (US);
Sang-Hoon Shin, Seongnam-si (KR)

(73) Assignee: SecuGen Corporation, Santa Clara, CA (US)

( * ) Notice: Subject to any disclaimer, the term of this patent is extended or adjusted under 35 U.S.C. 154(b) by 58 days.

(21) Appl. No.: 14/173,531

(22) Filed: Feb. 5, 2014

(65) Prior Publication Data

US 2014/0153791 A1    Jun. 5, 2014

Related U.S. Application Data

(63) Continuation-in-part of application No. 13/204,446, filed on Aug. 5, 2011, now Pat. No. 8,666,127.

(60) Provisional application No. 61/878,559, filed on Sep. 16, 2013, provisional application No. 61/371,599, filed on Aug. 6, 2010.

(51) Int. Cl.
G06K 9/00          (2006.01)

(52) U.S. Cl.
CPC .......... G06K 9/00046 (2013.01); G06K 9/0012 (2013.01)

(58) Field of Classification Search
None
See application file for complete search history.

(56) References Cited

U.S. PATENT DOCUMENTS

| | | | |
|---|---|---|---|
| 6,324,020 B1 | 11/2001 | Teng et al. | |
| 6,870,946 B1 | 3/2005 | Teng et al. | |
| 6,917,695 B2 | 7/2005 | Teng et al. | |
| 7,394,919 B2 | 7/2008 | Rowe et al. | |
| 2002/0076089 A1 | 6/2002 | Muramatsu et al. | |
| 2005/0008197 A1 | 1/2005 | Dennis | |
| 2007/0196003 A1 | 8/2007 | Kim et al. | |
| 2010/0098302 A1* | 4/2010 | Shin et al. | 382/124 |
| 2012/0013724 A1* | 1/2012 | McNulty | G06K 9/0004 348/77 |
| 2013/0129163 A1* | 5/2013 | Chung et al. | 382/124 |

* cited by examiner

*Primary Examiner* — Jon Chang
(74) *Attorney, Agent, or Firm* — Silicon Valley Patent Group LLP

(57) ABSTRACT

Methods and Apparatus are provided for fake fingerprint detection. In one embodiment, an apparatus for determining validity of a fingerprint includes a prism having an imaging surface configured to be touched by a fingerprint, one or more light sources configured to produce an image based on a refractive index of a material presented in association with the fingerprint, one or more imaging sensors configured to capture the image, and a controller configured to determine validity of the fingerprint based on whether the image has been masked.

18 Claims, 19 Drawing Sheets

FAKE FINGERPRINT DETECTION SYSTEM

CROSS REFERENCE TO RELATED APPLICATIONS

This application in a continuation-in-part of U.S. non-provisional application bearing Ser. No. 13/204,446, "Method and Apparatus for Fake Fingerprint Detection," filed Aug. 5, 2011, which claims the benefit of U.S. provisional application bearing Ser. No. 61/371,599, "Method and Apparatus for Fake Fingerprint Detection," filed Aug. 6, 2010, assigned to the assignee hereof. This application also claims benefit of U.S. provisional application bearing Ser. No. 61/878,559, "Fake Fingerprint Detection System," filed Sep. 16, 2013, assigned to the assignee hereof. The aforementioned United States applications are hereby incorporated by reference in their entirety.

FIELD

The present invention relates to the field of fingerprint detection system. In particular, the present invention relates to method and apparatus for fake fingerprint detection.

BACKGROUND

Various fingerprint recognition devices have been used for commercial and military applications. Many of such conventional fingerprint recognition devices focus on matching patterns of a captured fingerprint to an existing database of fingerprint samples. If a match is found, the fingerprint is deemed to be valid, but if a match is not found, the fingerprint is deemed to be invalid. One of the drawbacks of such conventional fingerprint recognition devices is that they primarily focus on pattern matching and they are not able to distinguish whether the fingerprint being compared or analyzed is a real finger. In some situations, they do not have the ability to distinguish a fake fingerprint from a real fingerprint if the two have substantially the same fingerprint pattern.

Therefore, there is a need for methods and apparatuses for determining validity of fingerprints that can address the above issues of conventional fingerprint recognition devices.

SUMMARY

Methods and systems are provided for fake fingerprint detection. In one embodiment, a method for determining validity of a fingerprint includes providing a prism having an imaging surface configured to be touched by a fingerprint, illuminating one or more light sources to produce an image based on a refractive index of a material presented in association with the fingerprint, capturing the image using one or more imaging sensors, and determining validity of the fingerprint based on whether the image has been masked.

In another embodiment, an apparatus for determining validity of a fingerprint includes a prism having an imaging surface configured to be touched by a fingerprint, one or more light sources configured to produce an image based on a refractive index of a material presented in association with the fingerprint, one or more imaging sensors configured to capture the image, and a controller configured to determine validity of the fingerprint based on whether the image has been masked.

BRIEF DESCRIPTION OF THE DRAWINGS

The aforementioned features and advantages of the disclosure, as well as additional features and advantages thereof, will be more clearly understandable after reading detailed descriptions of embodiments of the disclosure in conjunction with the non-limiting and non-exhaustive aspects of following drawings. Like numbers are used throughout the figures.

DESCRIPTION OF EMBODIMENTS

Methods and systems are provided for fake fingerprint detection. The following descriptions are presented to enable any person skilled in the art to make and use the disclosure. Descriptions of specific embodiments and applications are provided only as examples. Various modifications and combinations of the examples described herein will be readily apparent to those skilled in the art, and the general principles defined herein may be applied to other examples and applications without departing from the scope of the disclosure. Thus, the present disclosure is not intended to be limited to the examples described and shown, but is to be accorded the widest scope consistent with the principles and features disclosed herein. The word "exemplary" or "example" is used herein to mean "serving as an example, instance, or illustration." Any aspect or embodiment described herein as "exemplary" or as an "example" in not necessarily to be construed as preferred or advantageous over other aspects or embodiments.

Some portions of the detailed description that follows are presented in terms of flowcharts, logic blocks, and other symbolic representations of operations on information that can be performed on a computer system. A procedure, computer-executed step, logic block, process, etc., is here conceived to be a self-consistent sequence of one or more steps or instructions leading to a desired result. The steps are those utilizing physical manipulations of physical quantities. These quantities can take the form of electrical, magnetic, or radio signals capable of being stored, transferred, combined, compared, and otherwise manipulated in a computer system. These signals may be referred to at times as bits, values, elements, symbols, characters, terms, numbers, or the like. Each step may be performed by hardware, software, firmware, or combinations thereof.

Figure 1:
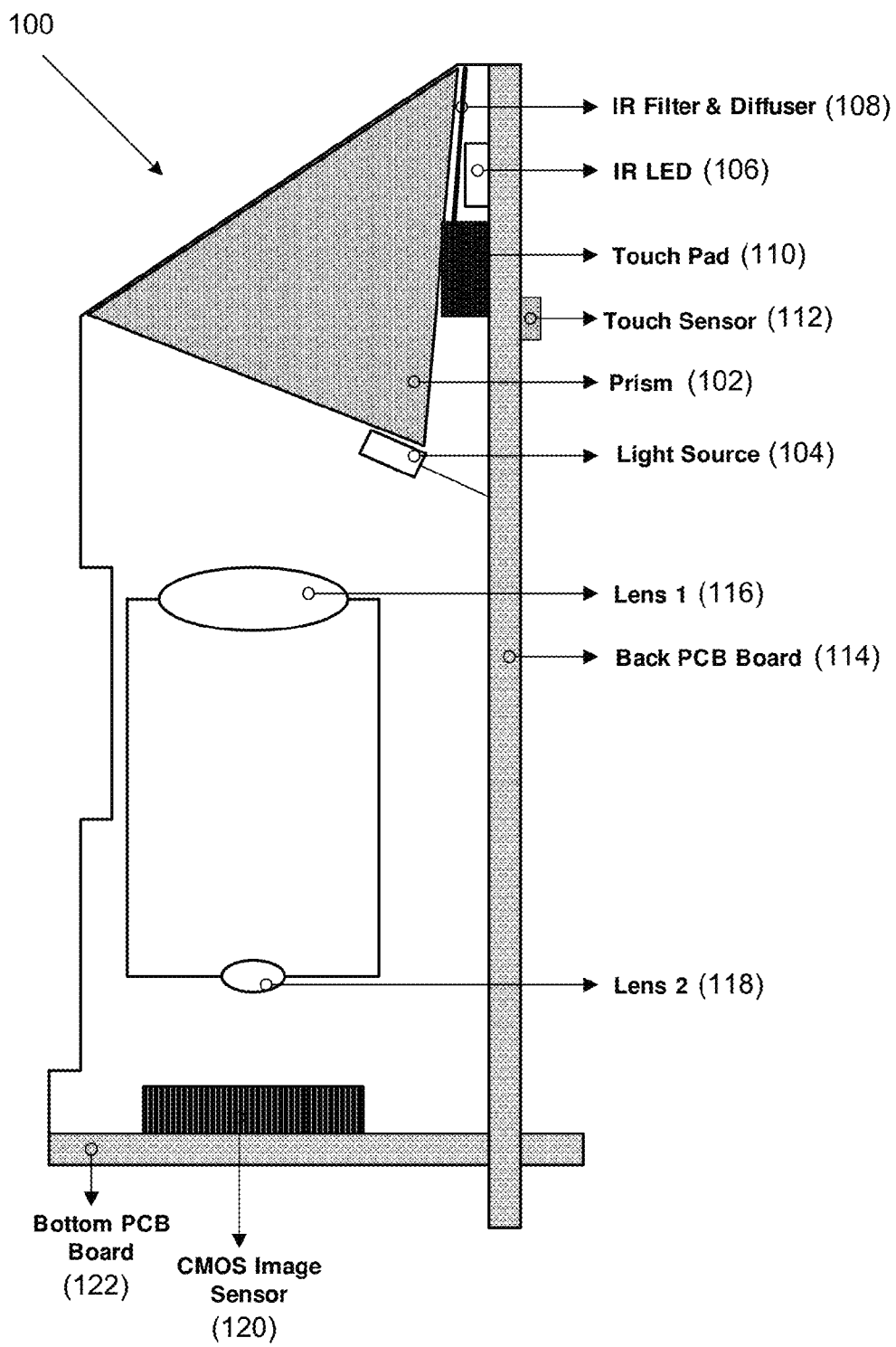
FIG. 1 illustrates a fingerprint recognition device according to embodiments of the present invention.

FIG. 1 illustrates a fingerprint recognition device according to embodiments of the present invention. In the exemplary implementation shown in FIG. 1, the fingerprint recognition device 100 includes a prism 102, a light source 104, an infrared (IR) light emitting diode (LED) 106, an IR filter and diffuser 108, a touch pad 110, a touch sensor 112, a set of lenses 116 and 118, a CMOS image sensor 120. The light source 104 may be implemented with a red LED, a white LED, or a LED capable of illuminating other colors. The fingerprint recognition device may also include one or more printed circuit boards (PCB), such as the back PCB 114, and the bottom PCB 122. However, the number and location of the PCBs may vary based on various design requirements.

According to embodiments of the present invention, the prism 102 is a transparent optical element with flat and polished surfaces. It refracts light carrying a fingerprint image (created by touching the prism), and delivers the fingerprint image via lenses 116 and 118, to the CMOS sensor 120. The light source 104 is used to generate a scattered light that illuminate the surface of fingerprint input side of the prism to create an inverse image. The IR LED 106 is used to generate a direct light that illuminates the surface of fingerprint input side of the prism to create a direct image. The captured image is a combination of the direct image and the inverse image, where the captured image is used in the process of analyzing fake finger detection. The IR filter and diffuser 108 (can also be referred to as an IR Pass Filter) is located between the prism 102 and the IR LED 106 to allow IR LED 106 light to pass into the prism and it blocks light having wavelength not in the IR range from passing through. In the example of FIG. 1, the IR filter 108 blocks light from the light source 104 from passing through in the areas covered by the IR filter 108.

The touch pad 110 is used to transmit touch signal through the prism to the touch sensor when a finger is placed on the surface of the prism. The touch sensor 112 is activated when a finger or an object that increases capacitance level, touches the prism surface of the fingerprint recognition device. The prism has a small conductive characteristic that is capable of delivering touch signal through the touch pad 110 to the touch sensor 112. The touch sensor 112 may be located anywhere on the PCB board depending on PCB design.

The lenses 116 and 118 are optical elements which transmit and refract light and the fingerprint image from the prism, and deliver it to the CMOS sensor 120. The CMOS sensor 120 captures the actual image that is placed on the prism and passed through the prism and lenses.

Figure 2:
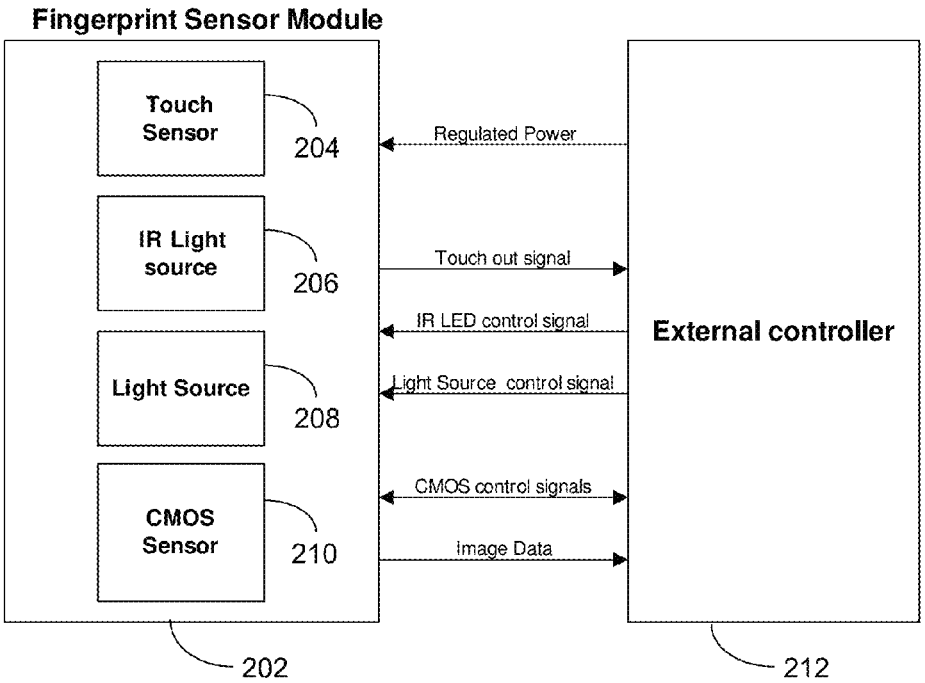
FIG. 2 illustrates a sensor module block diagram of the fingerprint recognition device of FIG. 1 according to embodiments of the present invention.

FIG. 2 illustrates a block diagram of a fingerprint sensor module according to embodiments of the present invention. In the example shown in FIG. 2, the fingerprint sensor module includes a touch sensor 204, an IR light source 206, a light source 208, and a CMOS sensor 208. The fingerprint sensor module is configured to communicate with an external controller 212, whereas various signals are transmitted between the fingerprint sensor module 202 and the external controller 212. For example, the fingerprint sensor module 202 receives regulated power, IR LED control signal, light source control signal, and certain CMOS sensor control signals from the external controller 212. On the other hand, the fingerprint sensor module provides output signals of touch sensor, image data, and certain other CMOS sensor control signals to the external controller 212.

According to embodiments of the present invention, the touch sensor 204 is activated when a finger or an object that increases capacitance level, touches on the prism surface of the fingerprint recognition device. The prism has a small conductive characteristic that delivers touch signal through the touch pad to the touch sensor. The IR light source 206 is used to illuminate the surface of fingerprint input device to create a direct image. This light source is used when analyzing fake finger detection process.

The light source 208 is used to generate a scattered light that illuminates the surface of fingerprint input device to create an inverse image of the fingerprint. Since the light source 208 and the IR light source 206 are illuminated at the same time, the captured image of the fingerprint is a combination of a direct image generated by the IR LED light and an inverse image generated by the light source 208. The captured image is used for analyzing fake finger detection. The CMOS sensor 210 captures the actual image that is placed on the prism and passed through the prism and lenses.

Figure 3:
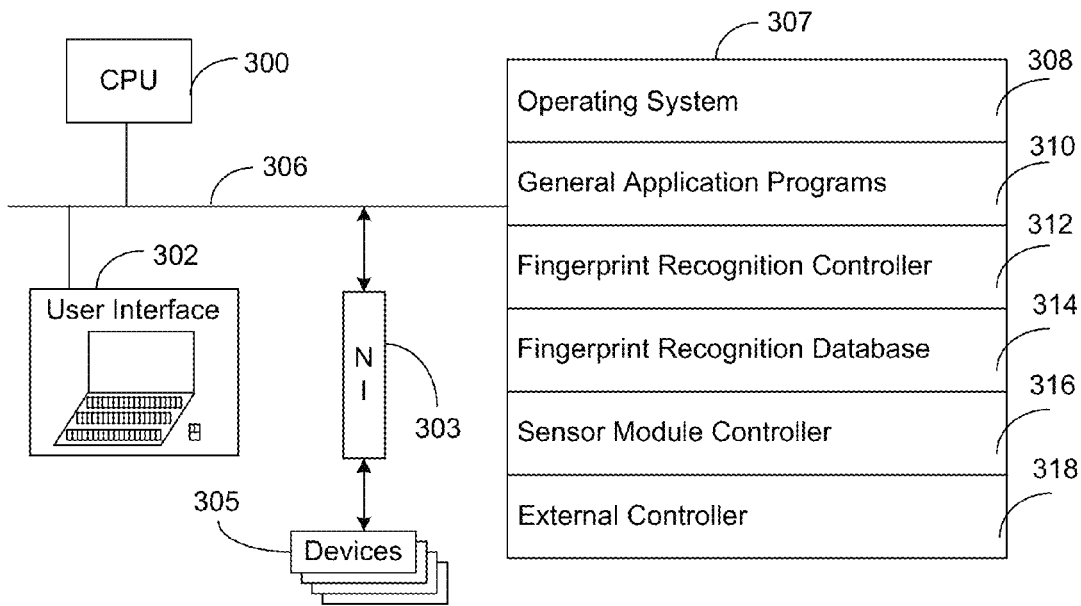
FIG. 3 illustrates a system configured to work with the fingerprint recognition device of FIG. 1 according to embodiments of the present invention.

FIG. 3 illustrates a computer system configured to work with the fingerprint recognition device of FIG. 1 according to embodiments of the present invention. The computer system includes one or more central processing units (CPUs) 300, at least a user interface 302, a memory device 304, a system bus 306, and one or more bus interfaces for connecting the CPU, user interface, memory device, and system bus together. The computer system also includes at least one network interface 303 for communicating with other devices 305 on a computer network, for example, one of such devices can be the fingerprint recognition device as disclosed by the present invention.

The memory device 307 may include high-speed random-access memory and may also include non-volatile memory, such as one or more magnetic disk storage devices. The memory device 307 may also include mass storage that is remotely located from the CPU(s) 300. The memory device 307 preferably stores:

- an operating system 308 that includes procedures for handling various basic system services and for performing hardware-dependent tasks;
- general application programs 310 for performing user-defined applications, tasks, and searchers;
- fingerprint recognition controller for controlling and performing fingerprint recognition detection;
- fingerprint recognition database 314 for use with the fingerprint recognition controller;
- sensor module controller 316 for controlling the sensing of the input fingerprint; and
- external controller 318 for controlling other functions of the fingerprint recognition device.

The above mentioned programs and databases may include executable procedures, sub-modules, tables, and other data structures. In other embodiments, additional or different modules and data structures may be used, and some of the modules and/or data structures listed above may not be used.

Figure 4:
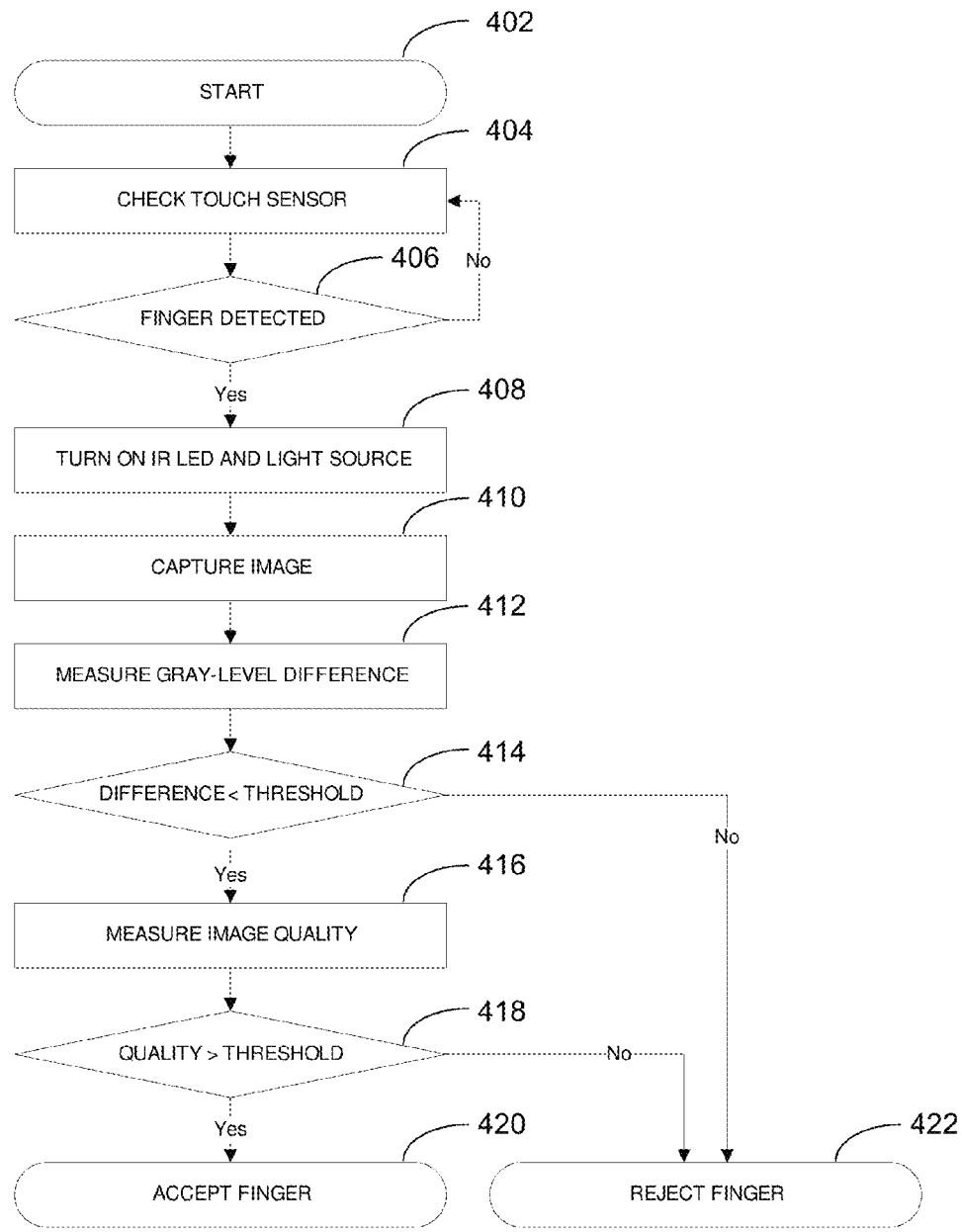
FIG. 4 illustrates a method for detecting a fake fingerprint according to embodiments of the present invention.

FIG. 4 illustrates a method for detecting a fake fingerprint according to embodiments of the present invention. The method starts in block 402 and moves to block 404 where the method checks the touch sensor of the fingerprint detection device. In block 406, a first determination is made as to whether a finger is detected. If a finger is detected (406_Yes), the method moves on to block 408. Alternatively, if a finger is not detected (406_No), the method returns to block 404, and continues to check the touch sensor for sensing whether the fingerprint detection device is touched by a finger. The touch sensor is activated only when a finger or an object that increases capacitance level, touches the surface of the fingerprint sensor. This function of the fingerprint detection device is used to distinguish between a real finger and a fake finger made by rubber or silicon material.

In block 408, the method turns on both the IRLED and the light source of the fingerprint detection device. With these two light sources being illuminated, the method captures both a direct image of the fingerprint and an inverse image of the fingerprint simultaneously in block 410 to form a single captured image. In block 412, the method measures the differences between the gray-level of the captured image with a first predetermined threshold value. Also, the method measures the rate of pixel variations of the captured image with a second predetermined threshold value. In block 414, a second determination is made as to whether the differences between the gray-level captured for the captured image as well as the rate of pixel variations of the captured image may be less than its corresponding predetermined threshold values. If the difference may be less than the corresponding predetermined threshold value (414_Yes), the method moves to block 416. Alternatively, if the difference is not less than (greater or equal to) the corresponding predetermined threshold value (414_No), the method moves to block 422. According to embodiments of the present invention, measuring gray level differences as well as the rate of pixel variations of the captured image (shown as TEST1 and TEST2 in FIGS. 6-9) are used to distinguish between a real finger and a fake finger-printed on a paper or film. For this purpose, both IR LED and light source are illuminated simultaneously to capture both the direct image and the inverse image of the fingerprint to form a single captured image. In one approach, when the differences between the gray-level captured for the captured image may be less than the first predetermined threshold, the test (Test 1) for the captured image is deemed to be passed. Similarly, when the rate of pixel variations for the captured image may be less than the second predetermined threshold, the test (Test 2) for the captured image is deemed to be passed.

In block 418, a third determination is made as to whether the quality of the captured image is higher than a third predetermined threshold. If the quality of the captured image is higher than the third predetermined threshold (418_Yes), the method moves to block 420. In the alternative, if the quality of the captured image is lower than the third predetermined threshold (418_No), the method moves to 422. In one approach, this step is to measure the image quality. After touch sensor (first determination 406) and gray level difference (second determination 414) tests have been passed, this step measures the quality of a fingerprint image and the method only allows the test (Test 3) to pass when the direct image of the fingerprint captured shows higher quality than the third predetermined threshold. In block 420, the method accepts the finger, which means the finger passes the three tests (Test 1, Test 2, and Test 3) described above. In block 422, the method rejects the finger, which means the finger fails one of the three tests (Test 1, Test 2, and Test 3) described above. The method ends in either block 420 or 422.

FIGS. 5-9 illustrate a series of user interfaces for controlling the fingerprint recognition device and communicating results of fingerprint recognition according to embodiments of the present invention.

Figure 5:
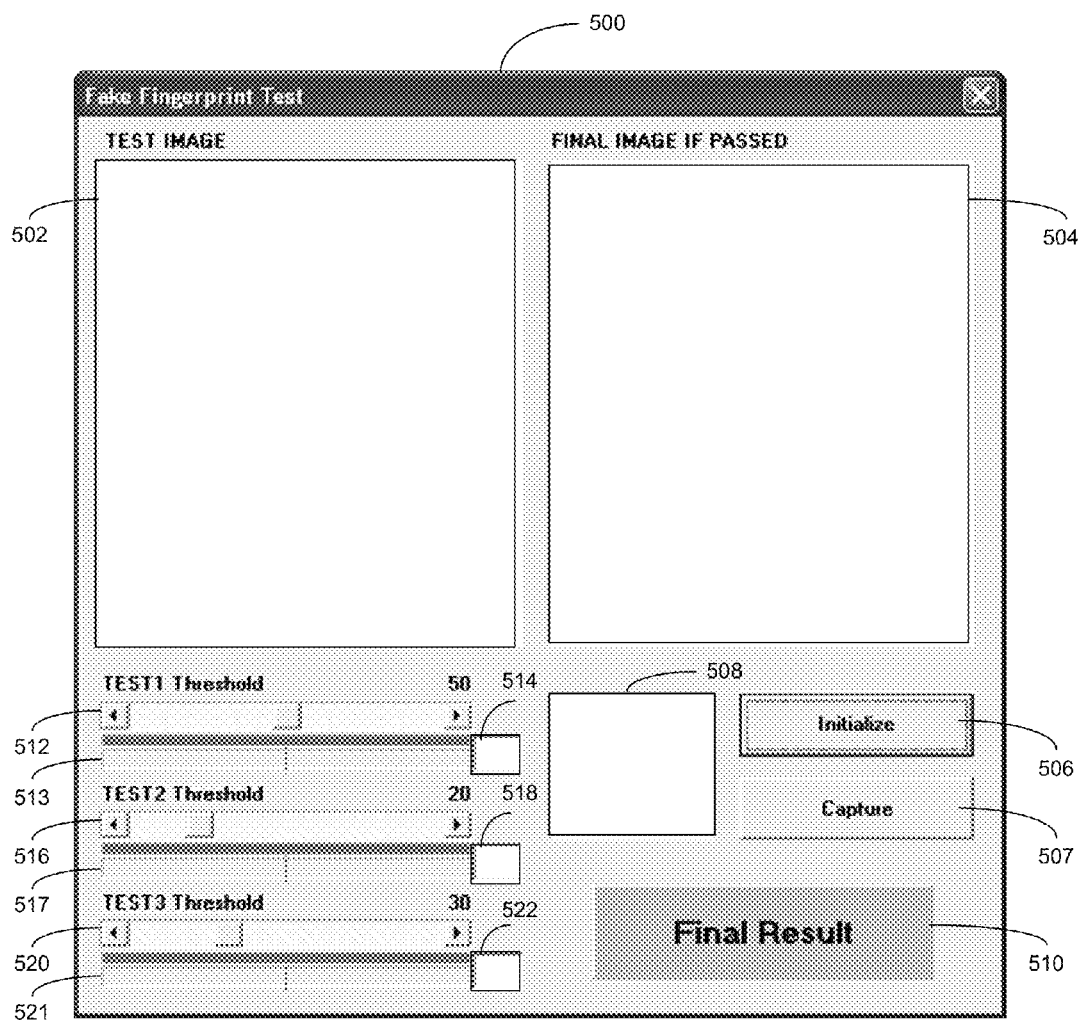
FIG. 5 illustrates a user interface used for fake fingerprint detection according to an embodiment of the present invention.

FIG. 5 illustrates a user interface used for fake fingerprint detection according to an embodiment of the present invention. In the implementation shown in FIG. 5, the user interface 500 includes a first window 502 for showing the test image, a second window 504 for showing the final image if it passed subsequent tests, an initialize button 506 for initializing the fingerprint detection process, a capture button 507 for capturing an image (with both IR LED 106 and light source 104 on) of a fingerprint under test, a preview window 508 for showing an image of an area of the fingerprint under test, and a final result window 510 for showing a determination of the fingerprint detection tests.

The test image shown in the first window 502 displays the image captured from the fingerprint sensor for fake finger detection process. In this case, both IR LED 106 and light source 104 are turned on. The image derived from both IR LED 106 and light source 104 is gathered and will be used to analyze and determine if the image is captured from a real finger or fake finger. The final image if passed shown in the second window 504 displays the final fingerprint image captured from the fingerprint sensor when test results described below are successful. In this case, only light source 104 is turned on.

According to embodiments of the present invention, there are three different tests conducted to analyze and determine whether a fingerprint is real or fake. Each test has its corresponding threshold value to determine the outcome of each test. For example, Test 1 and Test 2 are configured to measure differences in gray-level between the base image and the image captured from the fingerprint sensor ("test image") in certain area that is affected by both IR LED 106 and light source 104 ("test area"). The base image can be a certain fixed size of blank image (shown in white) in test area, or for more accurate result, it can be pre-captured when nothing is placed on the fingerprint sensor and white parts in test area (for example >250 gray level) can be used as the base image.

In one approach, Test 1 measures the average of gray level difference between base image and the test image in test area. To pass this test, the result value has to be lower than the threshold value. A first adjustable sliding bar 512 is used to indicate the first predetermined threshold value set for Test 1. And the corresponding first sliding window 513 and numeric window 514 indicate the threshold level of the actual captured fingerprint image for Test 1. Test 2 measures the rate of pixels on the captured fingerprint image that is darker than the base image in test area. In one approach, the "darker" may mean a difference of 10 or more levels of gray between the captured fingerprint image and the base image. This threshold difference in gray level is configurable by the user. For example, if there are 5 pixels, having gray level values 244, 245, 246, 247 and 248 are compared to a base image, if only two of the pixels having gray level values higher than the threshold difference (i.e. 10), then the rate of pixels higher than the threshold difference is 2 out of 5. To pass this test, the result value has to be lower than the threshold value. A second adjustable sliding bar 516 is used to indicate the second predetermined threshold value set for Test 2. And the corresponding second sliding window 517 and numeric window 518 indicate the actual threshold level of the captured fingerprint image for Test 2. Test 3 measures the quality of fingerprint image for the area that is affected by light source 104 only. To pass this test, the result value has to be higher than the threshold value. A third adjustable sliding bar 520 is used to indicate the third predetermined threshold value set for Test 3. And the corresponding third sliding window 521 and numeric window 522 indicate the actual captured fingerprint image for Test 3.

As shown in this example, the initialize button 506 makes the connection and initializes the fingerprint sensor device. The capture button 507 captures an image from the fingerprint sensor and performs three different tests and displays the final result. The preview window 508 shows an image of an area of the fingerprint under test. The final result button 510 displays the final result that may indicate whether the fingerprint being tested is PASSED or REJECTED. All three tests have to be passed to receive the PASSED final result.

Figure 6:
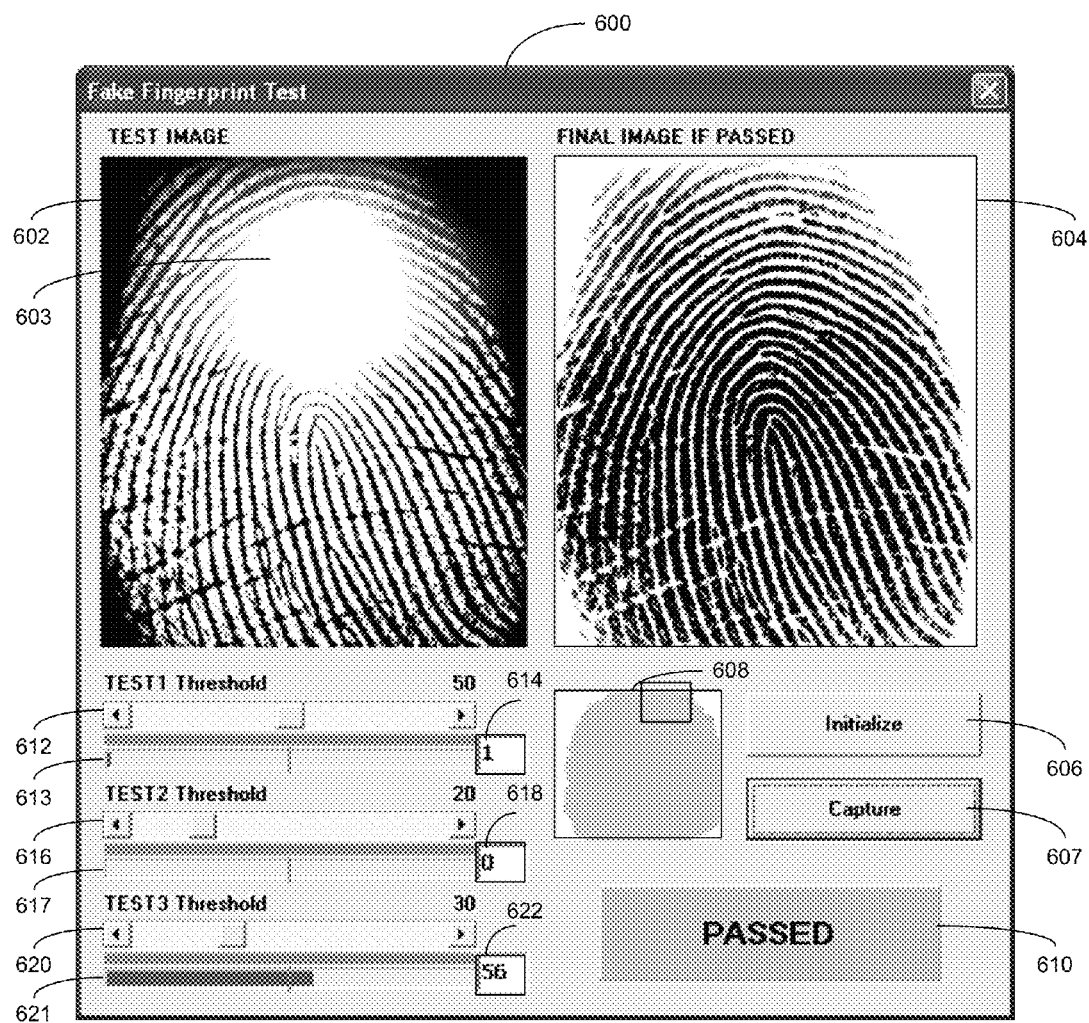
FIG. 6 illustrate another user interface used for fake fingerprint detection according to an embodiment of the present invention.

FIG. 6 illustrate another user interface used for fake fingerprint detection according to an embodiment of the present invention. In the implementation shown in FIG. 6, the user interface 600 includes a first window 602 for showing the test image, a second window 604 for showing the final image if it passed subsequent tests, an initialize button 606 for initializing the fingerprint detection process, a capture button 607 for manually capturing direct and inverse images of a fingerprint under test, a preview window 608 for showing an image of an area of the fingerprint under test, and a final result window 610 for showing a determination of the fingerprint detection tests.

The test image shown in the first window 602 displays the image captured from the fingerprint sensor for fake finger detection process. In this case, both IR LED 106 and light source 104 are turned on. The image derived from both IR LED 106 and light source 104 is gathered and will be used to analyze and determine if the image is captured from a real finger or fake finger. The final image is shown in the second window 604 displays the final fingerprint image captured from the fingerprint sensor when test results described below are successful.

In the example shown in FIG. 6, Test 1 measures the average of gray level difference between base image and the test image in test area. To pass this test, the result value has to be lower than the threshold value. A first adjustable sliding bar 612 is used to indicate the first predetermined threshold value set for Test 1. And the corresponding first sliding window 613 and numeric window 614 indicate the threshold level of the actual captured fingerprint image for Test 1. Test 2 measures the rate of pixels on the captured fingerprint image darker than the base image in test area. To pass this test, the result value has to be lower than the threshold value. A second adjustable sliding bar 616 is used to indicate the second predetermined threshold value set for Test 2. And the corresponding second sliding window 617 and numeric window 618 indicate the actual threshold level of the captured fingerprint image for Test 2. Test 3 measures the quality of fingerprint image for the area that is affected by light source 104 only. To pass this test, the result value has to be higher than the threshold value. A third adjustable sliding bar 620 is used to indicate the third predetermined threshold value set for Test 3. And the corresponding third sliding window 621 and numeric window 622 indicate the actual captured fingerprint image for Test 3.

In this example, the initialize button 606 makes the connection and initializes the fingerprint sensor device. The capture button 607 captures an image from the fingerprint sensor and performs three different tests and displays the final result. The preview window 608 shows an image of an area of the fingerprint under test. The final result button 610 displays the final result that may indicate whether the fingerprint being tested is PASSED or REJECTED. All three tests have to be passed to receive the PASSED final result 610.

As shown in FIG. 6, 602 is the image captured with both the IR LED 106 and light source 104 on, but only white portion 603 on top center is lighted by both lights and other area is lighted by only the light source 104. So, only the white portion 603 is used for analyzing, which is represented by the gray part in 608. When illuminated by both lights, if a real finger placed on the prism, the light source 104 generates a scattered light and which tends to create an inverse image of the fingerprint, for simplicity represented by 010101. While the IR LED generates a direct light and which tends to create a direct image of the fingerprint, for simplicity represented by 101010. The combination of both images creates 010101+101010=111111. On the other hand, if a fake finger with wet paper is placed on the prism, both the IR LED 106 and light source 104 tend to create a direct image, 010101, and the image captured by the combination of the two lights would be 010101. Therefore, the fake fingerprint is distinguished from the real fingerprint. Note that, for illustration purposes, 0s and 1s are used in the above explanation. In other implementations, different gray levels, for example 256 gray levels, from 0 to 255, may be used to represent each pixel. In the preview window 608, gray color is used to represent the test area, where most area in 608 is gray and very little border shows darker gray, which can be interpreted that the image is from a real finger.

This image shows when a real finger, in normal condition, is placed on the fingerprint sensor. All three tests are passed, and the final result is PASSED. Specifically, the test result (1) for Test 1 is lower than its threshold (50), so this test is passed. The test result (0) for Test 2 is lower than its threshold (20), so this test is passed. The test result (56) for Test 3 is higher than its threshold (30), so this test is passed.

Figure 7:
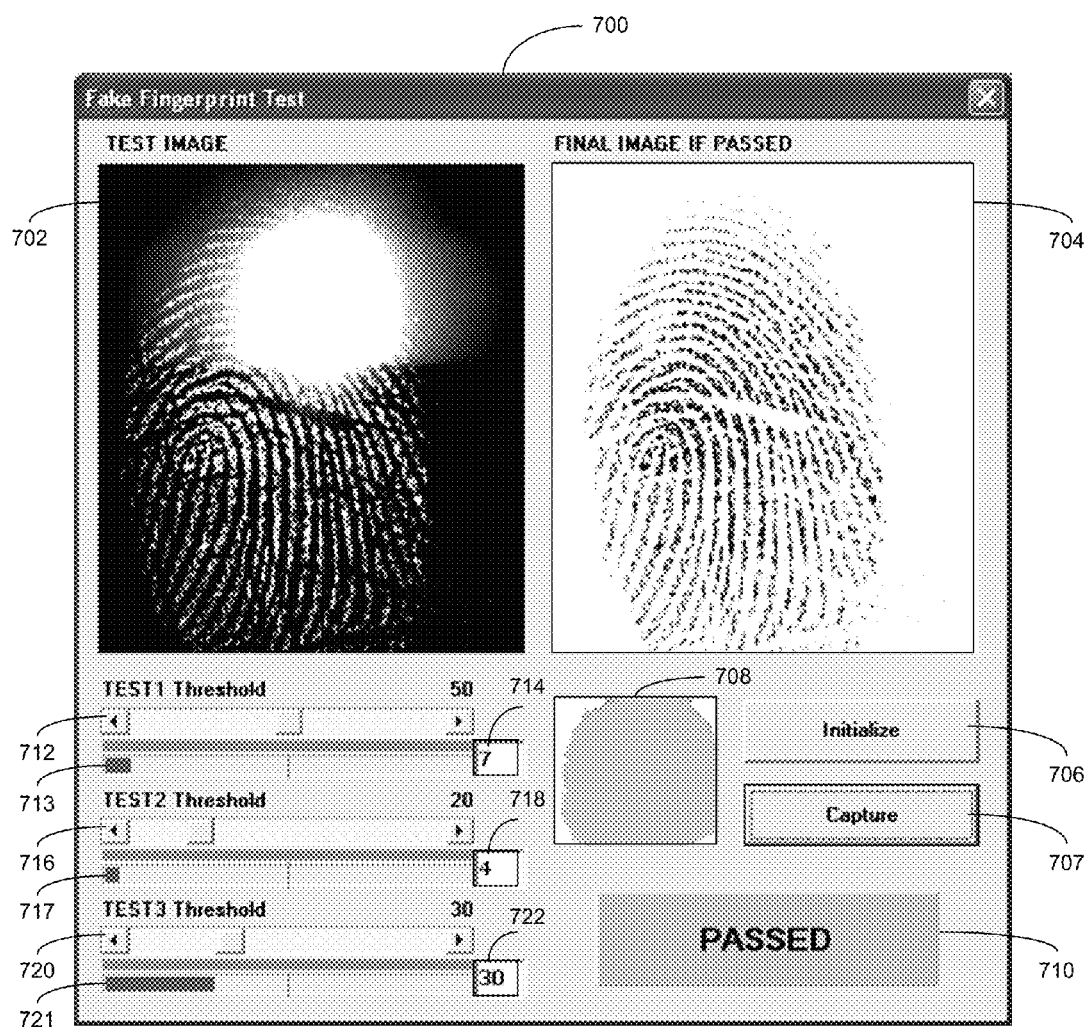
FIG. 7 illustrate yet another user interface used for fake fingerprint detection according to an embodiment of the present invention.

FIG. 7 illustrate yet another user interface used for fake fingerprint detection according to an embodiment of the present invention. In the implementation shown in FIG. 7, the user interface 700 includes a first window 702 for showing the test image, a second window 704 for showing the final image if it passed subsequent tests, an initialize button 706 for initializing the fingerprint detection process, a capture button 707 for manually capturing direct and inverse images of a fingerprint under test, a preview window 708 for showing an image of an area of the fingerprint under test, and a final result window 710 for showing a determination of the fingerprint detection tests.

The test image shown in the first window 702 displays the image captured from the fingerprint sensor for fake finger detection process. In this case, both IR LED 106 and light source 104 are turned on. The image derived from both IR LED 106 and light source 104 is gathered and will be used to analyze and determine if the image is captured from a real finger or fake finger. The final image is shown in the second window 704 displays the final fingerprint image captured from the fingerprint sensor when test results described below are successful.

In the example shown in FIG. 7, Test 1 measures the average of gray level difference between base image and the test image in test area. To pass this test, the result value has to be lower than the threshold value. A first adjustable sliding bar 712 is used to indicate the first predetermined threshold value set for Test 1. And the corresponding first sliding window 713 and numeric window 714 indicate the threshold level of the actual captured fingerprint image for Test 1. Test 2 measures the percentage of pixels on the captured fingerprint image darker than the base image in test area. To pass this test, the result value has to be lower than the threshold value. A second adjustable sliding bar 716 is used to indicate the second predetermined threshold value set for Test 2. And the corresponding second sliding window 717 and numeric window 718 indicate the actual threshold level of the captured fingerprint image for Test 2. Test 3 measures the quality of fingerprint image for the area that is affected by light source 104 only. To pass this test, the result value has to be higher than the threshold value. A third adjustable sliding bar 720 is used to indicate the third predetermined threshold value set for Test 3. And the corresponding third sliding window 721 and numeric window 722 indicate the actual captured fingerprint image for Test 3.

As shown in this example, the initialize button 706 makes the connection and initializes the fingerprint sensor device. The capture button 707 captures an image from the fingerprint sensor and performs three different tests and displays the final result. The preview window 708 shows an image of an area of the fingerprint under test. The final result button 710 displays the final result that may indicate whether the fingerprint being tested is PASSED or REJECTED. All three tests have to be passed to receive the PASSED final result 710.

This image shows when a real finger, in dry condition, is placed on the fingerprint sensor. All three tests are passed, and the final result is PASSED. Specifically, the test result (7) for Test 1 is lower than its threshold (50), so this test is passed. The test result (4) for Test 2 is lower than its threshold (20), so this test is passed. The test result (30) for Test 3 is higher than its threshold (30), so this test is passed.

Figure 8:
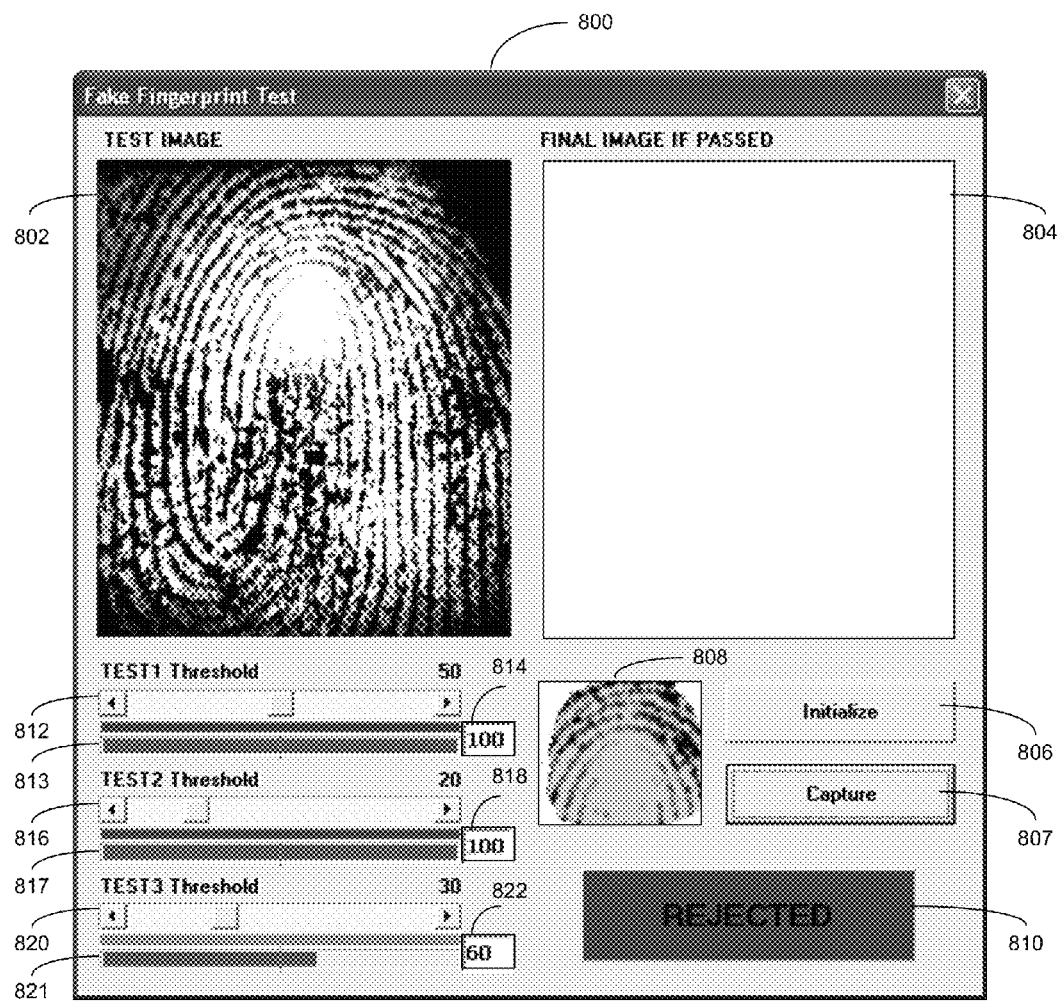
FIG. 8 illustrate yet another user interface used for fake fingerprint detection according to an embodiment of the present invention.

FIG. 8 illustrate yet another user interface used for fake fingerprint detection according to an embodiment of the present invention. In the implementation shown in FIG. 8, the user interface 800 includes a first window 802 for showing the test image, a second window 804 for showing the final image if it passed subsequent tests, an initialize button 806 for initializing the fingerprint detection process, a capture button 807 for manually capturing direct and inverse images of a fingerprint under test, a preview window 808 for showing an image of an area of the fingerprint under test, and a final result window 810 for showing a determination of the fingerprint detection tests.

The test image shown in the first window 802 displays the image captured from the fingerprint sensor for fake finger detection process. In this case, both IR LED 106 and light source 104 are turned on. The image derived from both IR LED 106 and light source 104 is gathered and will be used to analyze and determine if the image is captured from a real finger or fake finger. The final image is not shown in the second window 804 that displays the final fingerprint image captured from the fingerprint sensor because test results described below are not successful.

In the example shown in FIG. 8, Test 1 measures the average of gray level difference between base image and the test image in test area. To pass this test, the result value has to be lower than the threshold value. A first adjustable sliding bar 812 is used to indicate the first predetermined threshold value set for Test 1. And the corresponding first sliding window 813 and numeric window 814 indicate the threshold level of the actual captured fingerprint image for Test 1. Test 2 measures the percentage of pixels on the captured fingerprint image darker than the base image in test area. To pass this test, the result value has to be lower than the threshold value. A second adjustable sliding bar 816 is used to indicate the second predetermined threshold value set for Test 2. And the corresponding second sliding window 817 and numeric window 818 indicate the actual threshold level of the captured fingerprint image for Test 2. Test 3 measures the quality of fingerprint image for the area that is affected by light source 104 only. To pass this test, the result value has to be higher than the threshold value. A third adjustable sliding bar 820 is used to indicate the third predetermined threshold value set for Test 3. And the corresponding third sliding window 821 and numeric window 822 indicate the actual captured fingerprint image for Test 3.

As shown in this example, the initialize button 806 makes the connection and initializes the fingerprint sensor device. The capture button 807 captures an image from the fingerprint sensor and performs three different tests and displays the final result. The preview window 808 shows an image of an area of the fingerprint under test. The final result button 810 displays the final result that may indicate whether the fingerprint being tested is PASSED or REJECTED. All three tests have to be passed to receive the PASSED final result 810.

This image shows when a fake finger (wet paper) is placed on the fingerprint sensor. Two tests are not passed in this case, and therefore the final result is REJECTED as shown in window 810. Specifically, the test result (100) of Test 1 is not lower than its threshold (50), so this test is not passed. The test result (100) of Test 2 is not lower than its threshold (20), so this test is not passed. The test result (60) of Test 3 is higher than its threshold (30), so this is passed. Since Test 1 and Test 2 are failed, the fingerprint is REJECTED as a result.

Figure 9:
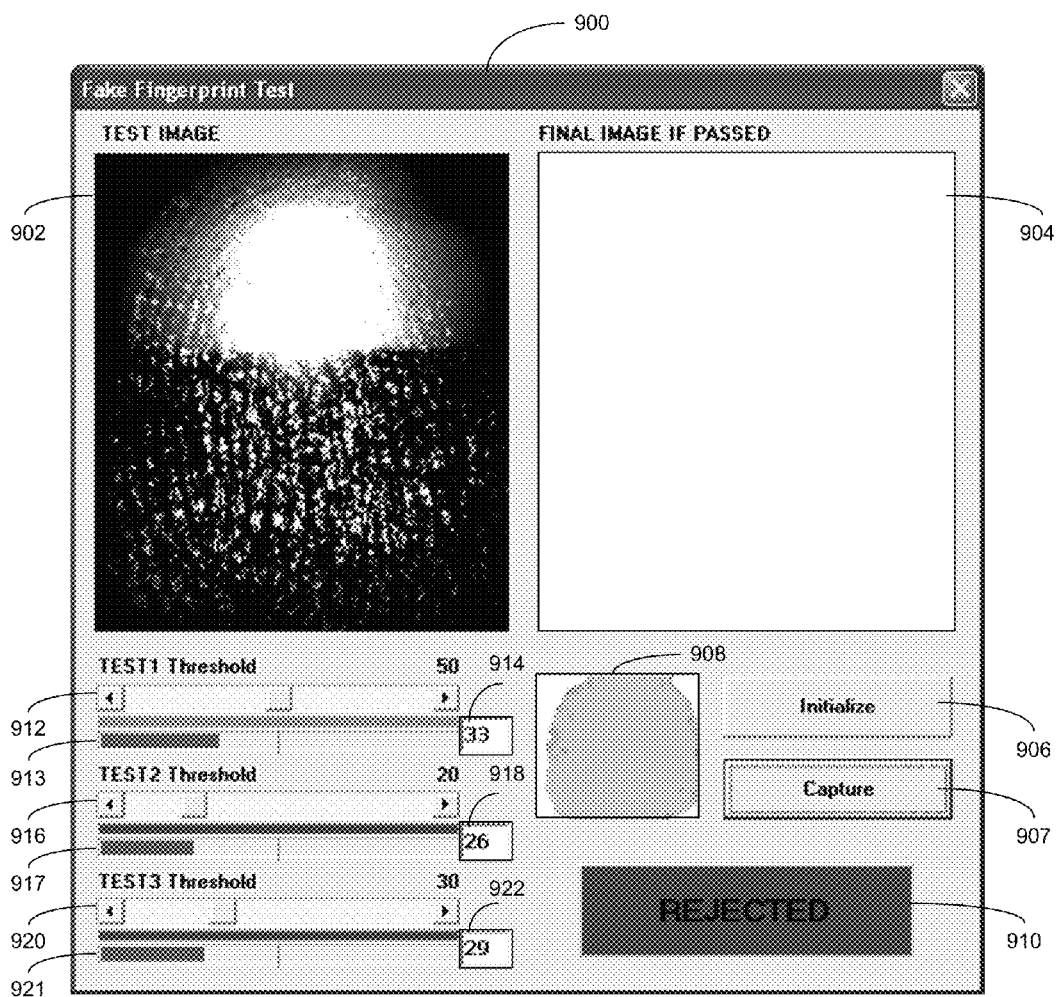
FIG. 9 illustrate yet another user interface used for fake fingerprint detection according to an embodiment of the present invention.

FIG. 9 illustrate yet another user interface used for fake fingerprint detection according to an embodiment of the present invention. In the implementation shown in FIG. 9, the user interface 900 includes a first window 902 for showing the test image, a second window 904 for showing the final image if it passed subsequent tests, an initialize button 906 for initializing the fingerprint detection process, a capture button 907 for manually capturing direct and inverse images of a fingerprint under test, a preview window 908 for showing an image of an area of the fingerprint under test, and a final result window 910 for showing a determination of the fingerprint detection tests.

The test image shown in the first window 902 displays the image captured from the fingerprint sensor for fake finger detection process. In this case, both IR LED 106 and light source 104 are turned on. The image derived from both IR LED 106 and light source 104 is gathered and will be used to analyze and determine if the image is captured from a real finger or fake finger. The final image is not shown in the second window 904 that displays the final fingerprint image captured from the fingerprint sensor because test results described below are not successful.

In the example shown in FIG. 9, Test 1 measures the average of gray level difference between base image and the test image in test area. To pass this test, the result value has to be lower than the threshold value. A first adjustable sliding bar 912 is used to indicate the first predetermined threshold value set for Test 1. And the corresponding first sliding window 913 and numeric window 914 indicate the threshold level of the actual captured fingerprint image for Test 1. Test 2 measures the percentage of pixels on the captured fingerprint image darker than the base image in test area. To pass this test, the result value has to be lower than the threshold value. A second adjustable sliding bar 916 is used to indicate the second predetermined threshold value set for Test 2. And the corresponding second sliding window 917 and numeric window 918 indicate the actual threshold level of the captured fingerprint image for Test 2. Test 3 measures the quality of fingerprint image for the area that is affected by light source 104 only. To pass this test, the result value has to be higher than the threshold value. A third adjustable sliding bar 920 is used to indicate the third predetermined threshold value set for Test 3. And the corresponding third sliding window 921 and numeric window 922 indicate the actual captured fingerprint image for Test 3.

As shown in this example, the initialize button 906 makes the connection and initializes the fingerprint sensor device. The capture button 907 captures an image from the fingerprint sensor and runs three test points and displays the final result. The preview window 908 shows an image of an area of the fingerprint under test. The final result button 910 displays the final result that may indicate whether the fingerprint being tested is PASSED or REJECTED. All three tests have to be passed to receive the PASSED final result 910.

This image shows when a fake finger (lightly wet paper) is placed on the fingerprint sensor. Two tests are not passed, and therefore the final result is REJECTED as shown in window 910. Specifically, the test result (33) of Test 1 is lower than its threshold (50), so this test is passed. The test result (26) of Test 2 is not lower than its threshold (20), so this test is not passed. The test result (29) of Test 3 is not higher than its threshold (30), so this test is not passed. Since Test 2 and Test 3 are failed, the fingerprint is REJECTED as a result.

FIGS. 10-13 illustrate another series of user interfaces for controlling/using the fingerprint recognition device and communicating results of fingerprint recognition according to embodiments of the present invention.

Figure 10:
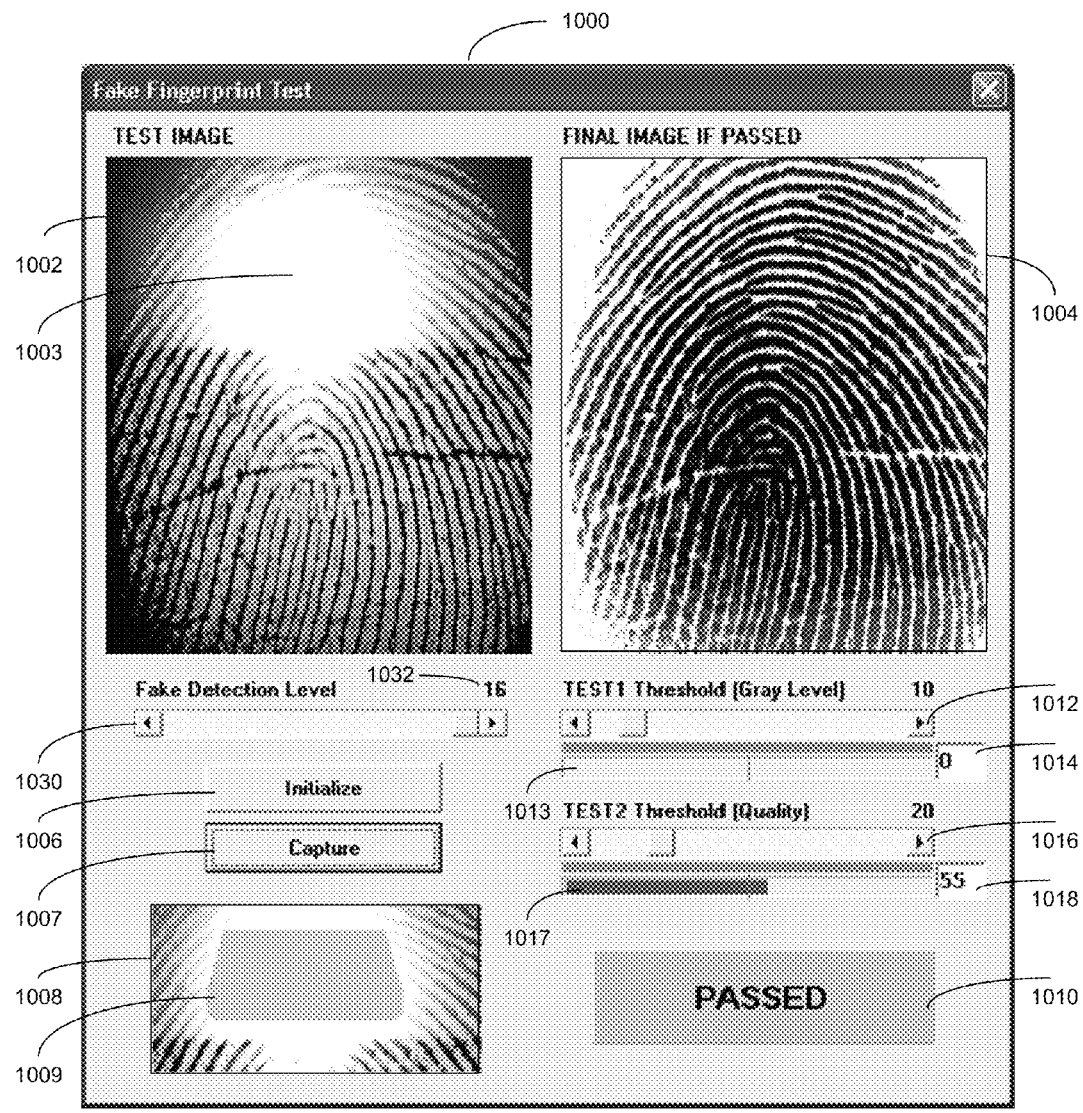
FIG. 10, FIG. 11, FIG. 12, and FIG. 13 illustrate another series of user interfaces for controlling/using the fingerprint recognition device and communicating results of fingerprint recognition according to embodiments of the present invention.

In the implementation shown in FIG. 10, the user interface 1000 includes a first window 1002 for showing the test image, a second window 1004 for showing the final image if it passed subsequent tests, an initialize button 1006 for initializing the fingerprint detection process, a capture button 1007 for capturing direct and inverse images of a fingerprint under test, a preview window 1008 for showing an image of an area of the fingerprint under test, and a final result window 1010 for showing a determination of the fingerprint detection tests (PASSED or REJECTED). Both Test1 and Test2 described below have to be passed to receive a PASSED final result.

The test image shown in the first window 1002 displays the image captured from the fingerprint sensor for fake finger detection process. In this case, both IR LED 106 and light source 104 are turned on. The image derived from both IR LED 106 and light source 104 is gathered and used to analyze and determine if the image is captured from a real finger or fake finger. The final image is shown in the second window 1004 that displays the final fingerprint image captured from the fingerprint sensor when test results described below are successful.

In the example shown in FIG. 10, fake detection level sliding bar 1030 allows user to set a detection level (indicated by a number in window 1032), which the level is set at 16 in this example. The fake detection level 1032 can be configured to operate with any combination of the touch sensor 112 and the image sensor 120. For example, both the touch sensor 112 and the image sensor can be turned on, or one of the touch sensor 112 or the image sensor 120 can be turned on. The fake detection level can also be configured based on various security requirements, environmental, and other conditions. The various security levels can be set based on the security requirements for governmental, commercial, and personal applications. For example, the security level may be higher for governmental applications such as obtaining authorization to access a building, a room, or parts of an airport. The security level may be set for commercial applications such as obtaining authorization to access bank accounts, computer accounts, or other databases. The security level may be set lower for personal applications such as obtaining authorization to use personal electronic devices or obtaining authorization to enter a personal residence. In addition, various environmental conditions, such as temperature (taking into consideration of hot and cold conditions), and humidity (taking into consideration of dry and wet conditions) can be used to set the fake detection level 1030. Furthermore, the fake detection level can also be configured based on the skin colors of the fingerprints to be tested. In the example shown in FIG. 10, 16 detection levels are shown. Person skilled in the art would appreciate that different detection levels, such as 32, 64, and 128, can be created based on any combination of security requirements, environmental and other conditions described above.

Based on the fake detection level setting, an area 1009 (also referred to as the check area) within the preview window 1008 is determined during the initialization or calibration phase of the fingerprint detection process. The check area 1009 represents the area indicated by numeral 1003 in the first window 1002. A larger check area 1009 can be configured to correspond to a higher security fake detection level, and a smaller check area 1009 can be configured to correspond to a lower security fake detection level. In addition, the thresholds for both Test1 and Test 2 described below can also be adjusted based on the settings of the fake detection level 1030.

Test 1 measures the gray level difference between base image and the test image in test area. To pass this test, the result value has to be lower than the threshold value. A first adjustable sliding bar 1012 is used to indicate a first predetermined threshold value set for Test 1. And the corresponding first sliding window 1013 and numeric window 1014 indicate the threshold level of a captured fingerprint image for Test 1.

Test 2 measures the quality of fingerprint image for the area that is affected by light source 104, which represents the area in the bottom half of the first window 1002. To pass this test, the result value has to be higher than the threshold value. A second adjustable sliding bar 1016 is used to indicate a second predetermined threshold value set for Test 2. And the corresponding second sliding window 1017 and numeric window 1018 indicate the threshold of a captured fingerprint image for Test 2. In other embodiments, Test 2 may be configured to examine contrasts of neighboring pixel in areas between valleys and ridges of the fingerprint, and use this information to determine the validity of the fingerprint. In yet other embodiments, Test 2 may also be configured to examine ridge lines and valley lines formed by ridges and valleys in the fingerprint image, and use this information to determine the validity of the fingerprint. In yet other embodiments, Test 2 may also be configured to examine minutia features of the fingerprint to determine they actually exist. In particular, Test 2 may be configured to examine the minutia features of the fingerprint ridges, such as ridge ending, bifurcation, and short ridge (or dot). The ridge ending is the point at which a ridge terminates. Bifurcations are points at which a single ridge splits into two ridges. Short ridges (or dots) are ridges which are significantly shorter than the average ridge length on the fingerprint. Minutiae features and patterns can be useful in the analysis of fingerprints because no two fingers have been shown to be identical minutia features.

As shown in FIG. 10, the first window 1002 displays an image captured with both the IR LED 106 and light source 104 on. Note that the white portion 1003 on top center is lighted by both IR LED 106 and light source 104 and other area of window 1002 is lighted primarily by the light source 104. In this example, the white portion 1003 is used for image analysis in Test1, which is represented by the gray part in 1008. When illuminated by both light sources, if a real finger placed on the prism, the light source 104 generates a scattered light and which tends to create an inverse image of the fingerprint, for simplicity represented by 010101. While the IR LED 106 generates a direct light and which tends to create a direct image of the fingerprint, for simplicity represented by 101010. The combination of both images creates 010101+101010=111111. On the other hand, if a fake finger (for example a fingerprint on a piece of wet paper) is placed on the prism, both the IR LED 106 and light source 104 tend to create a direct image, 010101, and the image captured by the combination of the two lights would be 010101. In this manner, the fake fingerprint can be distinguished from the real fingerprint. Note that, for illustration purposes, 0s and 1s are used in the above explanation. In other implementations, different gray levels, for example 256 gray levels, from 0 to 255, may be used to represent each pixel. In the preview window 1008, gray color is used to represent the test area, where most area in 1008 is gray and very little border shows darker gray, which can be interpreted that the image is from a real finger.

This image shows when a real finger is placed on the fingerprint sensor, and with a fake detection level set at 16. Specifically, the test result (0) for Test 1 is lower than its threshold (10), so Test1 is passed. The test result (55) for Test 2 is higher than its threshold (20), so Test2 is passed. Since both Test1 and Test2 are passed, thus the final result is PASSED, as shown in 1010.

Figure 11:
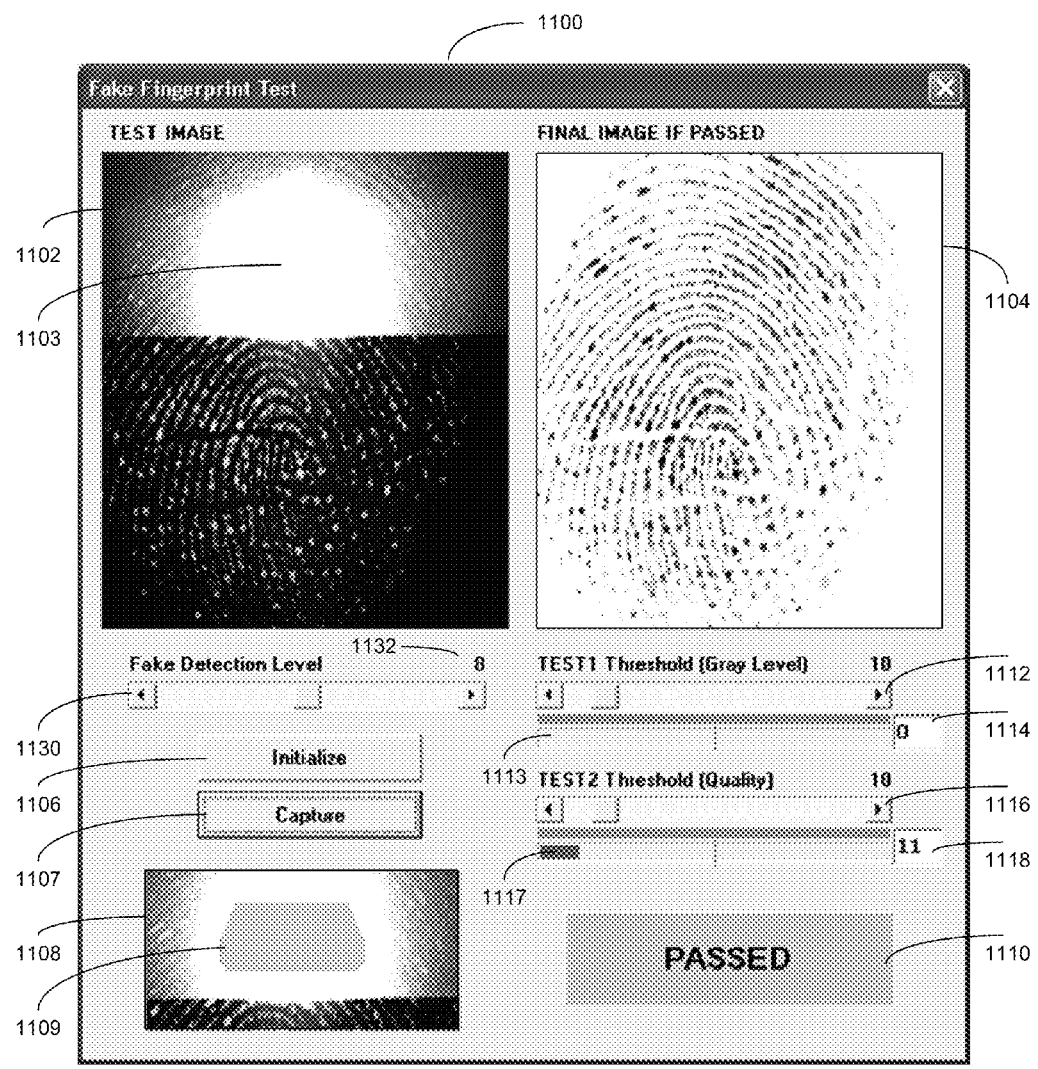

The user interface and methodologies employed in FIG. 11 are similar to that of FIG. 10. The user interface 1100 includes a first window 1102 for showing the test image, a second window 1104 for showing the final image if it passed subsequent tests, an initialize button 1106 for initializing the fingerprint detection process, a capture button 1107 for capturing direct and inverse images of a fingerprint under test, a preview window 1108 for showing an image of an area of the fingerprint under test, and a final result window 1110 for showing a determination of the fingerprint detection tests (PASSED or REJECTED). Both Test1 and Test2 described below have to be passed to receive a PASSED final result.

The test image shown in the first window 1102 displays the image captured from the fingerprint sensor for fake finger detection process. In this case, both IR LED 106 and light source 104 are turned on. The image derived from both IR LED 106 and light source 104 is gathered and used to analyze and determine if the image is captured from a real finger or fake finger. The final image is shown in the second window 1104 that displays the final fingerprint image captured from the fingerprint sensor when test results described below are successful.

In the example of FIG. 11, fake detection level sliding bar 1130 allows user to set a fake detection level (indicated by a number in window 1132). The fake detection level 1132 can be configured to operate with any combination of the touch sensor 112 and the image sensor 120. For example, both the touch sensor 112 and the image sensor can be turned on, or one of the touch sensor 112 or the image sensor 120 can be turned on. The fake detection level can also be configured based on various security requirements, environmental, and other conditions, which is set at 8 as shown in FIG. 11.

Based on the fake detection level setting, an area 1109 (also referred to as the check area) within the preview window 1108 is determined during the initialization or calibration phase of the fingerprint detection process. The check area 1109 represents the area indicated by numeral 1103 in the first window 1002. Comparing to the check area 1009 of FIG. 10, the check area 1109 is smaller because a lower fake detection level (8 in FIG. 11 as compared to 16 in FIG. 10) is selected for this test. In addition, the thresholds for both Test1 and Test 2 described below can also be adjusted based on the settings of the fake detection level 1132.

Test 1 measures the average of gray level difference between base image and the test image in test area. To pass this test, the result value has to be lower than the threshold value. A first adjustable sliding bar 1112 is used to indicate a first predetermined threshold value set for Test 1. And the corresponding first sliding window 1113 and numeric window 1114 indicate the threshold level of a captured fingerprint image for Test 1. Test 2 measures the quality of fingerprint image for the area that is affected by light source 104, which represents the area in the bottom half of the first window 1102. To pass this test, the result value has to be higher than the threshold value. A second adjustable sliding bar 1116 is used to indicate a second predetermined threshold value set for Test 2. And the corresponding second sliding window 1117 and numeric window 1118 indicate the threshold of a captured fingerprint image for Test 2.

This image shows when a real finger is placed on the fingerprint sensor, and with a fake detection level set at 8. Specifically, the test result (0) for Test 1 is lower than its threshold (10), so Test1 is passed. The test result (11) for Test 2 is higher than its threshold (10), so Test2 is passed. Since both Test1 and Test2 are passed, thus the final result is PASSED, as shown in 1110.

Figure 12:
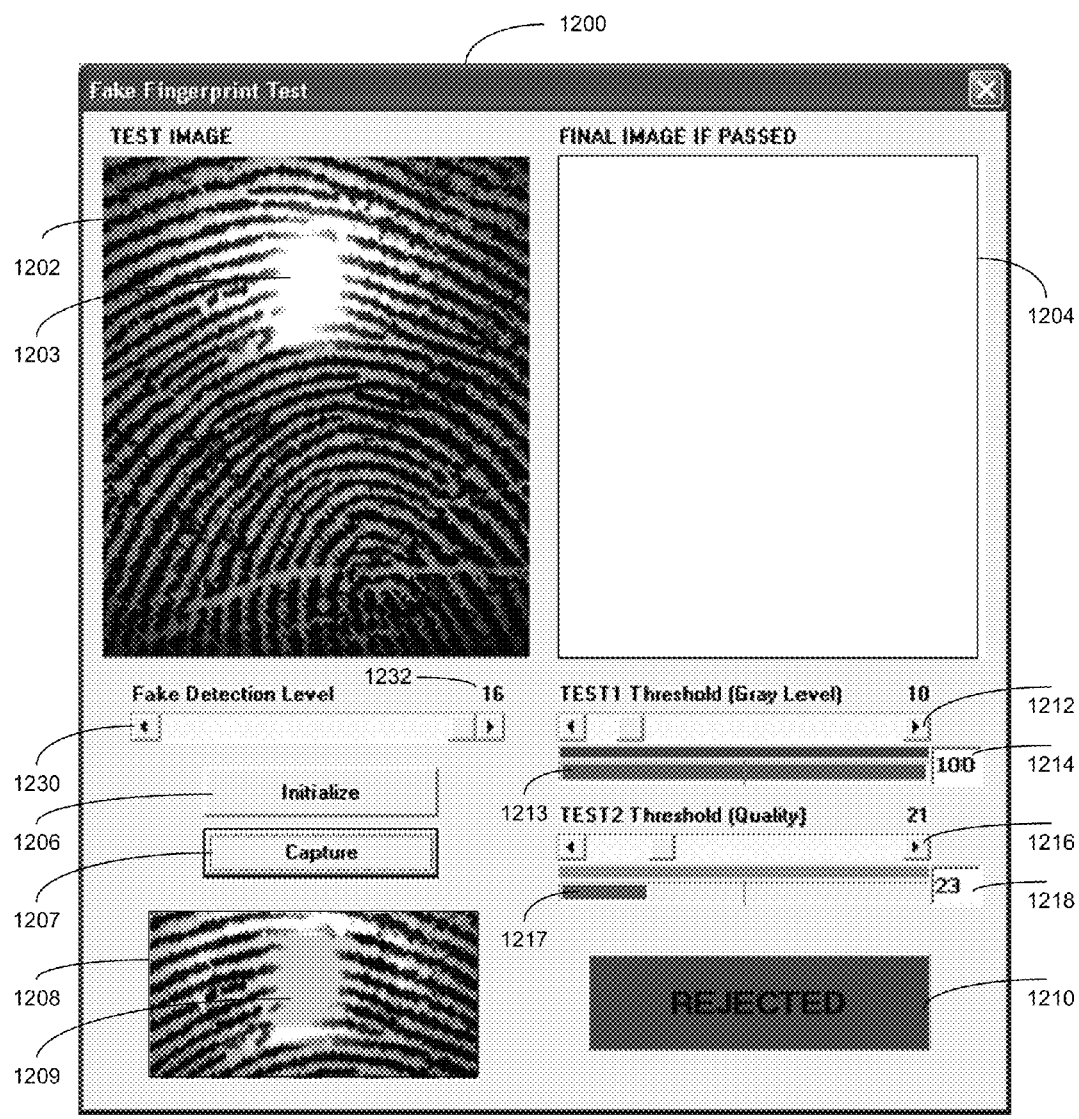

The user interface and methodologies employed in FIG. 12 are similar to that of FIG. 10. The user interface 1200 includes a first window 1202 for showing the test image, a second window 1204 for showing the final image if it passed subsequent tests, an initialize button 1206 for initializing the fingerprint detection process, a capture button 1207 for capturing direct and inverse images of a fingerprint under test, a preview window 1208 for showing an image of an area of the fingerprint under test, and a final result window 1210 for showing a determination of the fingerprint detection tests (PASSED or REJECTED). Both Test1 and Test2 described below have to be passed to receive a PASSED final result.

The test image shown in the first window 1202 displays the image captured from the fingerprint sensor for fake finger detection process. In this case, both IR LED 106 and light source 104 are turned on. The image derived from both IR LED 106 and light source 104 is gathered and used to analyze and determine if the image is captured from a real finger or fake finger. The final image would be shown in the second window 1204 that displays the final fingerprint image captured from the fingerprint sensor if test results described below were successful.

In the example of FIG. 12, fake detection level sliding bar 1230 allows user to set a fake detection level (indicated by a number in window 1232). The fake detection level 1232 can be configured to operate with any combination of the touch sensor 112 and the image sensor 120. For example, both the touch sensor 112 and the image sensor can be turned on, or one of the touch sensor 112 or the image sensor 120 can be turned on. The fake detection level can also be configured based on various security requirements, environmental, and other conditions, which is set at 16 as shown in FIG. 12.

Based on the fake detection level setting, an area 1209 (also referred to as the check area) within the preview window 1208 is determined during the initialization or calibration phase of the fingerprint detection process. The check area 1209 represents the area indicated by numeral 1203 in the first window 1202. In addition, the thresholds for both Test1 and Test 2 described below can also be adjusted based on the settings of the fake detection level 1232.

Test 1 measures the average of gray level difference between base image and the test image in test area. To pass this test, the result value has to be lower than the threshold value. A first adjustable sliding bar 1212 is used to indicate a first predetermined threshold value set for Test 1. And the corresponding first sliding window 1213 and numeric window 1214 indicate the threshold level of a captured fingerprint image for Test 1. Test 2 measures the quality of fingerprint image for the area that is affected by light source 104, which represents the area in the bottom half of the first window 1202. To pass this test, the result value has to be higher than the threshold value. A second adjustable sliding bar 1216 is used to indicate a second predetermined threshold value set for Test 2. And the corresponding second sliding window 1217 and numeric window 1218 indicate the threshold of a captured fingerprint image for Test 2.

This image shows when a fake finger represented by a sheet of fingerprint is placed on the fingerprint sensor, and with a fake detection level set at 16. Specifically, the test result (100) for Test 1 is higher than its threshold (10), so Test1 is failed. The test result (23) for Test 2 is higher than its threshold (21), so Test2 is passed. Since Test1 failed, the final result is REJECTED, as shown in 1210, and no image is displayed in window 1204.

Figure 13:
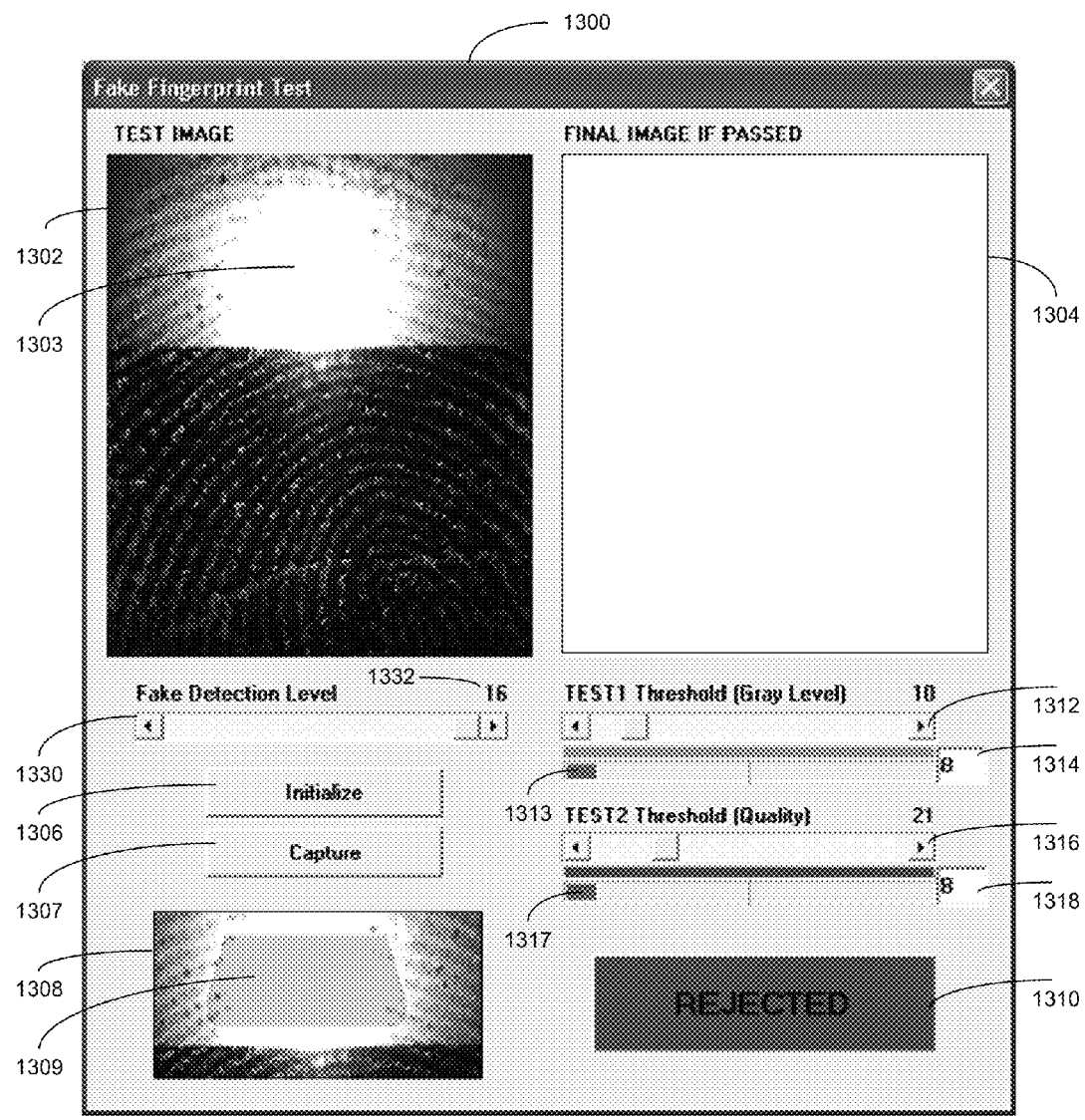

The user interface and methodologies employed in FIG. 13 are similar to that of FIG. 10. The user interface 1300 includes a first window 1302 for showing the test image, a second window 1304 for showing the final image if it passed subsequent tests, an initialize button 1306 for initializing the fingerprint detection process, a capture button 1307 for capturing direct and inverse images of a fingerprint under test, a preview window 1308 for showing an image of an area of the fingerprint under test, and a final result window 1310 for showing a determination of the fingerprint detection tests (PASSED or REJECTED). Both Test1 and Test2 described below have to be passed to receive a PASSED final result.

The test image shown in the first window 1302 displays the image captured from the fingerprint sensor for fake finger detection process. In this case, both IR LED 106 and light source 104 are turned on. The image derived from both IR LED 106 and light source 104 is gathered and used to analyze and determine if the image is captured from a real finger or fake finger. The final image would be shown in the second window 1304 that displays the final fingerprint image captured from the fingerprint sensor if test results described below were successful.

In the example of FIG. 13, fake detection level sliding bar 1330 allows user to set a fake detection level (indicated by a number in window 1332). The fake detection level 1332 can be configured to operate with any combination of the touch sensor 112 and the image sensor 120. For example, both the touch sensor 112 and the image sensor can be turned on, or one of the touch sensor 112 or the image sensor 120 can be turned on. The fake detection level can also be configured based on various security requirements, environmental, and other conditions, which is set at 16 as shown in FIG. 13.

Based on the fake detection level setting, an area 1309 (also referred to as the check area) within the preview window 1308 is determined during the initialization or calibration phase of the fingerprint detection process. The check area 1309 represents the area indicated by numeral 1303 in the first window 1302. In addition, the thresholds for both Test1 and Test 2 described below can also be adjusted based on the settings of the fake detection level 1332.

Test 1 measures the average of gray level difference between base image and the test image in test area. To pass this test, the result value has to be lower than the threshold value. A first adjustable sliding bar 1312 is used to indicate a first predetermined threshold value set for Test 1. And the corresponding first sliding window 1313 and numeric window 1314 indicate the threshold level of a captured fingerprint image for Test 1. Test 2 measures the quality of fingerprint image for the area that is affected by light source 104, which represents the area in the bottom half of the first window 1302. To pass this test, the result value has to be higher than the threshold value. A second adjustable sliding bar 1316 is used to indicate a second predetermined threshold value set for Test 2. And the corresponding second sliding window 1317 and numeric window 1318 indicate the threshold of a captured fingerprint image for Test 2.

This image shows when a fake finger represented by a sheet of fingerprint is placed on the fingerprint sensor, and with a fake detection level set at 16. Specifically, the test result (8) for Test 1 is lower than its threshold (10), so Test1 is passed. The test result (8) for Test 2 is lower than its threshold (21), so Test2 is failed. Since Test2 failed, the final result is REJECTED, as shown in 1310, and no image is displayed in window 1304.

According to aspects of the present disclosure, a number of methods have been used to attempt to trick or spoof an unattended fingerprint recognition system into accepting a fake fingerprint as a real fingerprint. These include the use of: 1) Facsimiles of fingerprint on paper, film, etc. applied with or without a liquid; 2) Molds of a fingertip using plastic, rubber, adhesive, silicone, gelatin, etc., whether made as a model of the whole fingertip or as a thin layer to be placed on top of a person's finger; and 3) Latent fingerprints, whether used in-situ un-doctored, or lifted from a surface, enhanced with powders or other particulate matter, humidity or other volatile substances, etc., and presented directly, applied to a substrate before presentation, or reproduced as a facsimile.

Methods to generate counterfeit or falsified fingerprints involve varying levels of complexity, time, skill, know-how, and cooperation of the owner of the finger being counterfeited. The present disclosure addresses the use of common methods used to spoof optical fingerprint recognition systems: facsimile of fingerprint on paper, film, etc. applied with a liquid.

Common substrates on which to make facsimiles of fingers are paper, plastic film, vinyl film, and acrylic film. These materials usually require the application of a transparent liquid between the facsimile and the imaging surface of the fingerprint acquisition apparatus to enhance the imaging of the facsimile. If the fingerprint recognition system employs any anti-spoofing feature that requires a level of conductivity, an electrically conductive liquid could also simulate the presence of a real finger. The most common liquid used is water, and in some cases, saliva.

According to aspects of the present disclosure, one way a fingerprint image may be obtained from a typical optical fingerprint acquisition apparatus is described as follows. Light rays can be directed through a refracting device, of which a finger is placed on one surface. The presence of the finger at the surface causes the incoming light rays to alter in direction, intensity, or number of rays. The altered light rays carry information about the image of the fingerprint presented at the surface. The altered light rays are directed out of the refracting device and into a light collector that receives information about the fingerprint image. Specifically, light rays that strike the ridges of a finger respond differently from those that strike the valleys of a finger. The differences between these responses produce a degree of contrast that is adequate for imaging.

According to aspects of the present disclosure, one way a facsimile of a fingerprint may be imaged by the same optical fingerprint acquisition apparatus is described as following. First, illumination light can be directed through a refracting device, of which a facsimile of a finger is placed on one surface. The presence of the facsimile at the surface causes the incoming light rays to alter in direction, intensity, or number of rays. The altered light rays carry information about the image of the facsimile presented at the surface. The altered light rays are directed out of the refracting device and into a light collector that receives information about the image of the facsimile. In order for the apparatus to produce an image of the facsimile, light rays that strike bright areas of a facsimile would respond differently from those that strike the dark areas of the facsimile. The differences between these responses produce a degree of contrast adequate for imaging, although it might have a lower amount of contrast compared to that of a real finger. The application of a liquid between the facsimile and the imaging surface of the light refractor allows for better contact with the surface and more sensitive interaction between the incoming light and the pattern of bright and dark areas of the facsimile. An application that uses such a liquid (also referred to as liquid gate) as described herein may be used as the calibration, testing, or certification of optical fingerprint acquisition apparatuses by various agencies, for compliance with image quality standards.

In one exemplary implementation, an absorption type of fingerprint acquisition device, in regions of the imaging surface where there are fingerprint valleys, incident light can be internally reflected and captured by the one or more image sensors. In regions of the imaging surface where there are fingerprint ridges, incident light may be absorbed, and a lower intensity light is captured by the one or more image sensors. As a result, the captured image has dark ridges and white valleys. The area surrounding the fingerprint also appears white. The fingerprint images are displayed as is without inversion on a screen by a conventional computer software program.

In another exemplary implementation, in a scattering type of fingerprint acquisition device, in regions of the imaging surface where there are fingerprint ridges, incident light can be scattered and captured as light image data by the one or more image sensors. In regions of the imaging surface where there are fingerprint valleys, incident light may be mostly absorbed, and practically no light would be reflected, scattered or captured by the one or more image sensors. As a result, the captured image has light ridges and dark valleys. The area surrounding the fingerprint also appears dark. The fingerprint images may then be inverted to show dark ridges and white valleys surrounded by white when displayed on a screen by a computer software program.

In either case, to reduce noise by ambient light (i.e. light coming into the prism through the Imaging Surface from outside the prism, whether the light may be originated from the surrounding medium or from refracted light exiting and re-entering the prism through the Imaging Surface by reflection) and to increase contrast, the one or more image sensors can be positioned so that $\alpha_1$ may be greater than the critical angle at the prism/air interface. This can ensure that no ambient light would be captured.

Figure 14A:
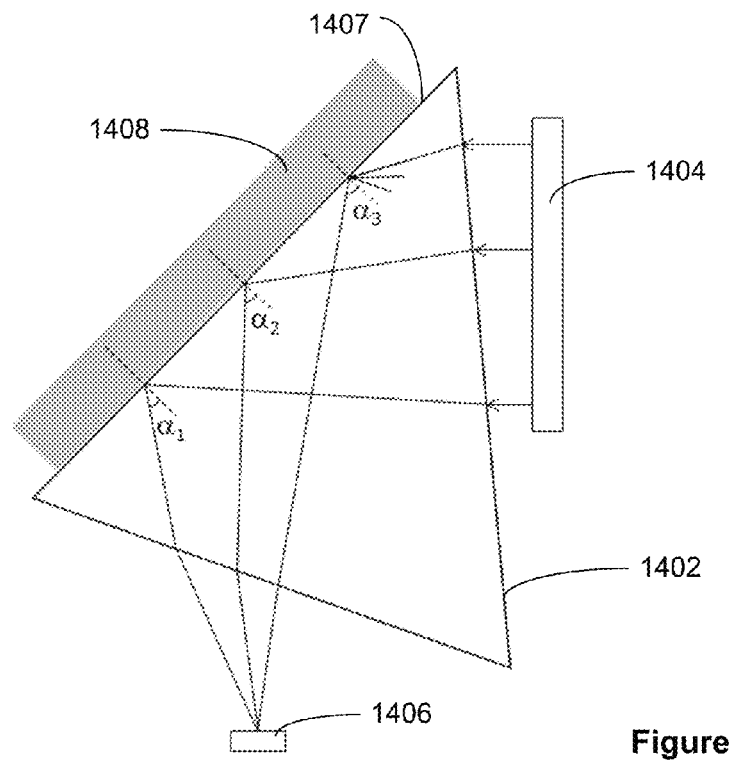
FIG. 14A illustrates a method for detecting fake fingerprint presented as a printed medium with an absorption imaging acquisition device according to aspects of the present disclosure.

FIG. 14A illustrates a method for detecting fake fingerprint presented as a printed medium with an absorption imaging acquisition device according to aspects of the present disclosure. As shown in FIG. 14A, the apparatus includes a prism 1402, one or more light sources 1404, and one or more image sensors 1406. In this example, the apparatus may be configured to detect a printed material 1408 soaked in a liquid that may touch the imaging surface 1407. According to aspects of the present disclosure, the liquid includes at least one of water, saliva, or ethanol. The printed material may include at least one of paper, plastic film, vinyl film or acrylic film.

In one exemplary approach, illumination light can be projected onto the imaging surface 1407 at incident angles greater than the critical angle at the prism/air interface and can be internally reflected from the imaging surface. The intensities and angles of the reflected light respond to the finger placed on the imaging surface 1407. The one or more image sensors may receive fingerprint image-carrying light that is reflected from the imaging surface 1407. The optical structure can be configured so that the one or more image sensors may capture light having a range of angles $\alpha$ that increases along the length of the imaging surface; that is, it may increase from the edge closest to the viewing surface, to the edge furthest from the viewing surface, such that $\alpha_1$ corresponding to point 1 may be less than $\alpha_2$, which corresponds to point 2 and may be less than $<\alpha_3$, which corresponds to point 3. The optical structure and one or more image sensors can be configured so that $\alpha_1$ may be greater than the critical angle at the prism/air interface and $\alpha_3$ may be less than the critical angle at the prism/finger interface.

According to aspects of the present disclosure, since incident light may be greater than the critical angle at the prism/air interface, light may be projected onto the imaging surface and reflected by total internal reflection from the valleys of the fingerprint. This reflected light can be received by the one or more image sensors to generate an image where the valleys appear white, only in the portion of the imaging surface where $\alpha$ may be greater than the critical angle at the prism/air interface.

If the incident light is less than the critical angle at the prism/finger interface, light projected onto the imaging surface may be refracted, partially absorbed by the ridges of the fingerprint, and partially reflected back into the prism at various angles due to scattering. The intensity of light reflected from the ridges and received by the one or more image sensors can be attenuated. The captured image may display ridges that appear darker than the white valleys. If the one or more image sensors were to receive light at an angle $\alpha_1$ less than the critical angle at the prism/air interface, the valleys of the fingerprint would appear dark because all incident light may be reflected at an angle greater than the critical angle at the prism/air interface, resulting in significantly lower image contrast. If $\alpha_3$ is greater than the critical angle at the prism/finger interface, the ridges of the fingerprint would not be imaged by the One or more image sensors.

For a prism having light striking the inside of the imaging surface, the critical angle of incident light at the boundary between a lower refractive index medium and the prism can be calculated as follows:

$\Theta c$=arcsin(refractive index of medium/refractive index of prism)

For example, if the material of a prism has an index of refraction of 1.50, then:
the critical angle $\Theta c$ at the prism/air interface would be:

$\Theta c$=arcsin(refractive index of air/refractive index of prism)=arcsin(1/1.50)=41.8°, the critical angle $\Theta c$ at the prism/finger interface would be:

$\Theta c$=arcsin(refractive index of finger/refractive index of prism)=arcsin(1.417/1.50)=70.9° and, according to aspects of the present disclosure, $\alpha_1$ can be greater than 41.8°, and $\alpha_3$ can be less than 70.9°.

If a medium having a refractive index greater than that of air and less than that of a finger, such as water, exists outside of the imaging surface, then the imaging region would be shortened due to the higher refractive index of the medium. For example, if the material of a prism has an index of refraction of 1.50, then:
the critical angle $\Theta c$ at the prism/air interface would be:

$\Theta c$=arcsin(refractive index of air/refractive index of prism)=arcsin(1/1.50)=41.8°, the critical angle $\Theta c$ at the prism/water interface would be:

$\Theta c$=arcsin(refractive index of water/refractive index of prism)=arcsin(1.33/1.50)=62.5°, and, for the present disclosure, $\alpha_1$ can be greater than 41.8°, and $\alpha_2$ can be less than 62.5° while $\alpha_3$ can be less than 70.9.

In one exemplary situation, if water is applied on the entire surface of the imaging surface and a facsimile of a fingerprint is placed on the prism, for the portion of the imaging surface where a may be smaller than 62.5°, light projected onto the imaging surface would be reflected from the valleys that may be printed in white but absorbed by the ridges that may be printed in black. The light received by the one or more image sensors may generate an image having dark ridges and white valleys just like a real finger, but for only that portion of the imaging surface where α may be smaller than 62.5°. For the portion of the imaging surface where a may be greater than 62.5°, any light received from the imaging surface would come from total internal reflection of incident light, thereby generating an image that can be all white. This portion of the facsimile would not appear in the image. The final image may result with a portion of the facsimile image masked in white.

The apparatus may be configured so that, for a real fingerprint in air, an entire image can be generated, while for a facsimile of a fingerprint in a liquid having a refractive index greater than that of air and less than that of a finger, only a portion of an image may be generated.

Figure 14B:
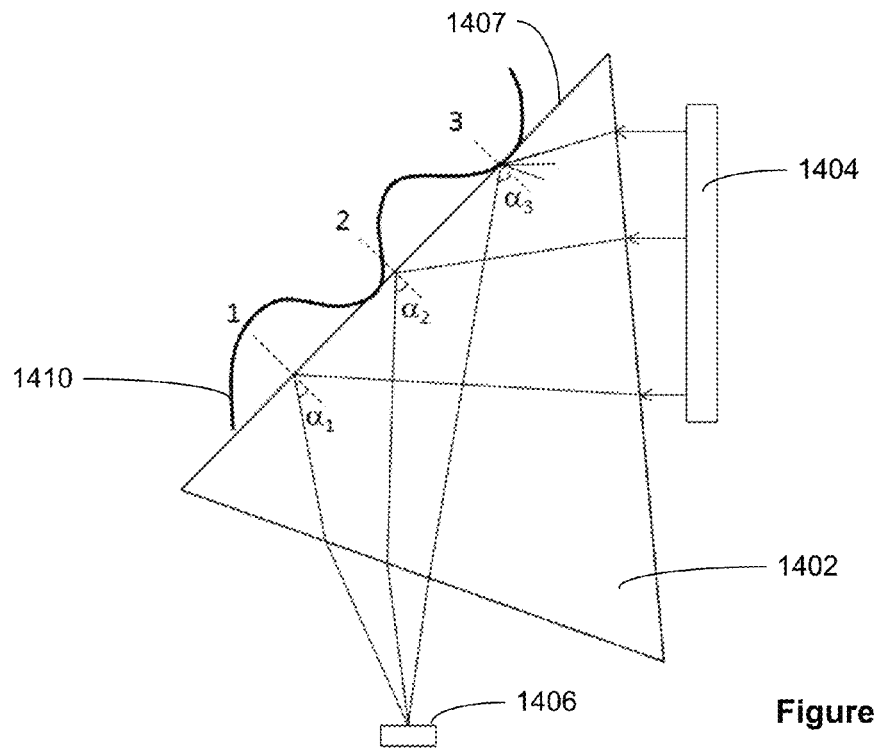
FIG. 14B illustrates a method for detecting fake fingerprint presented as a manufactured finger with an absorption imaging acquisition device according to aspects of the present disclosure.

FIG. 14B illustrates a method for detecting fake fingerprint presented as a manufactured finger with an absorption imaging acquisition device according to aspects of the present disclosure. Note that the apparatus shown in FIG. 14 B can be similar to the apparatus shown in FIG. 14A. It includes a prism 1402, one or more light sources 1404, and one or more image sensors 1406. In this example, the apparatus may be configured to detect a manufactured finger 1410 made of a solid material that may touch the imaging surface 1407. According to aspects of the present disclosure, the solid material includes at least one of paper, plastic film, vinyl film, acrylic film, rubber or latex. The approach of detecting the manufactured finger 1410 can be substantially similar to the approach of detecting the printed material 1408 soaked in a liquid as described in association with FIG. 14A above.

Figure 15A:
FIG. 15A illustrates an example of a real fingerprint.

FIG. 15A illustrates an example of a real fingerprint detected by using an absorption imaging acquisition device according to aspects of the present disclosure. In FIG. 15A, an image 1502 of a real finger 1504 is shown.

Figure 15B:
FIG. 15B illustrates an example of a fake fingerprint having a portion of the fingerprint image being masked.

FIG. 15B illustrates an example of a fake fingerprint having a portion of the fingerprint image being masked detected by using an absorption imaging acquisition device according to aspects of the present disclosure. In FIG. 15B, an image 1506 of a fake finger is shown. In particular, the image 1506 of the fake finger may include two image regions, namely a first image region 1508 and a second image region 1510, which can be generated by applying the techniques described above in association with FIG. 14A and FIG. 14B.

Figure 15C:
FIG. 15C illustrates another example of a fake fingerprint having a portion of the fingerprint image being masked.

FIG. 15C illustrates another example of a fake fingerprint having a portion of the fingerprint image being masked detected by using an absorption imaging acquisition device according to aspects of the present disclosure. In FIG. 15C, an image 1512 of a fake finger is shown. In particular, the image 1512 of the fake finger may include two image regions, namely a first image region 1514 and a second image region 1516, which can be generated by applying the techniques described above in association with FIG. 14A and FIG. 14B. Note that one of the differences between FIG. 15B and FIG. 15C can be that the area of the first image region and the second image region may be varied based on the difference of refractive index of the materials presented in association with the fake finger. This difference is further described below in association with FIG. 18A and FIG. 18B.

Figure 15D:
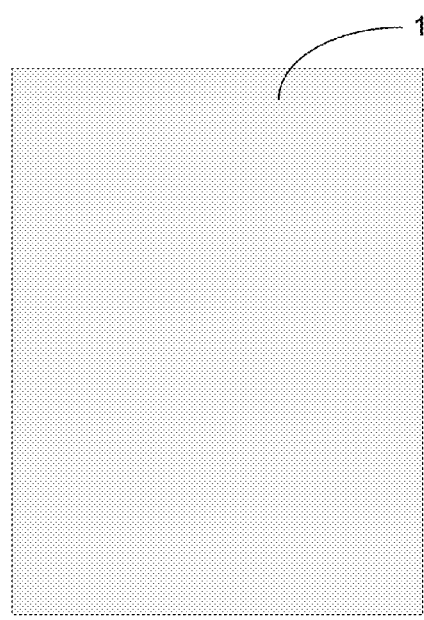
FIG. 15D illustrates yet another example of a fake fingerprint having the entire fingerprint image being masked; detected by using an absorption imaging acquisition device according to aspects of the present disclosure.

FIG. 15D illustrates yet another example of a fake fingerprint having the entire fingerprint image being masked detected by using an absorption imaging acquisition device according to aspects of the present disclosure. In FIG. 15D, an image 1518 of a fake finger is shown. In particular, the image 1518 of the fake finger may include only one image region 1520, which can be generated by applying the techniques described above in association with FIG. 14A and FIG. 14B. Note that one of the differences between FIG. 15D from that of FIG. 15B and FIG. 15C can be that the area of the first image region may be enlarged to cover the substantially entire image 1518. One scenario the area of the first image region may be increased can be that the material presented in association with the fingerprint may have a high refractive index.

As shown in examples FIG. 15A to FIG. 15D, about 100% of the image may be masked when attempting to image fake fingers (as in FIG. 15D), while retaining the capability to produce an entire image of real fingers (as in FIG. 15A). The amount of image that could be masked for fake fingers in a liquid would be a design choice that depends on the application balanced with other factors.

Figure 16A:
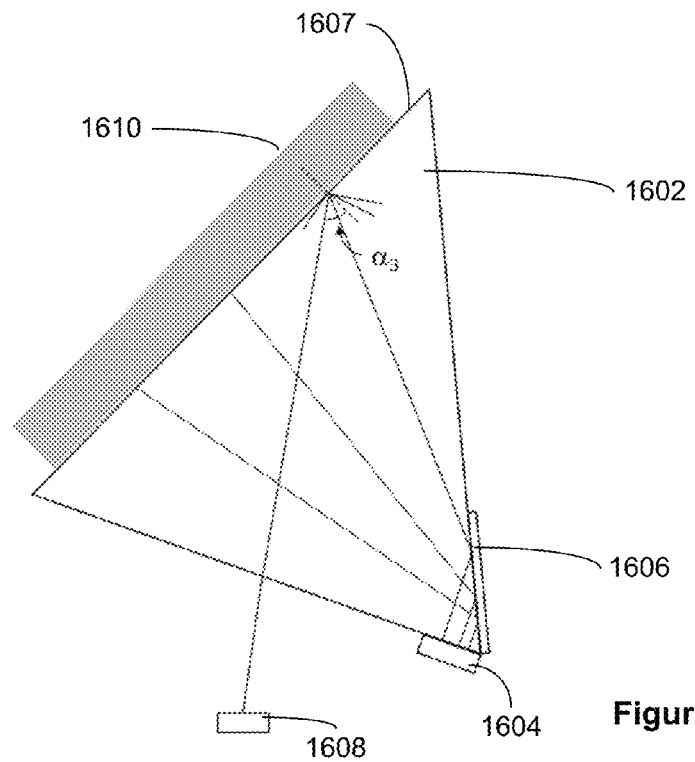
FIG. 16A illustrates a method for detecting fake fingerprint presented as a printed medium with a scattering imaging acquisition device according to aspects of the present disclosure.

FIG. 16A illustrates a method for detecting fake fingerprint presented as a printed medium with a scattering imaging acquisition device according to aspects of the present disclosure. As shown in FIG. 16A, the apparatus includes a prism 1602, one or more light sources 1604, filter and diffuser 1606, and one or more image sensors 1608. In this example, the apparatus may be configured to detect a printed material 1610 soaked in a liquid that may touch the imaging surface 1607. According to aspects of the present disclosure, the liquid includes at least one of water, saliva, or ethanol. The printed material may include at least one of paper, plastic film, vinyl film or acrylic film.

In one exemplary approach, illumination light may be projected onto the imaging surface at incident angles less than the critical angle at the prism/air interface, passes through the imaging surface into the medium outside of the imaging surface, and interacts with the finger placed on the imaging surface. The one or more image sensors may receive fingerprint image-carrying light that is reflected from the fingerprint ridges and scattered from the imaging surface. The optical structure can be configured so that the one or more image sensors may capture light having a range of angles $\alpha$ that increase along the length of the imaging surface; that is, it increases from the edge closest to the viewing surface, to the edge furthest from the viewing surface, such that $\alpha_1 < \alpha_2 < \alpha_3$. The apparatus can be configured so that $\alpha_1$ may be greater than the critical angle at the prism/air interface and $\alpha_3$ may be less than the critical angle at the prism/finger interface.

Since incident light may be less than the critical angle at the prism/air interface, light projected onto the imaging surface where there are fingerprint valleys, passes into the valleys, and can be partially reflected. This reflected light may not reach the one or more image sensors therefore making the valleys appear dark because reflected light that re-enters the prism can be refracted at an angle $\alpha$ that may be less than the critical angle at the prism/air interface.

Light projected onto the imaging surface where there are fingerprint ridges can be scattered from the ridges that may touch the surface of the prism. The scattered light can be received by the one or more image sensors to generate an image with bright ridges.

If the one or more image sensors 1608 were configured to receive light at an angle $\alpha_1$ less than the critical angle at the prism/air interface, the valleys of the fingerprint would also be imaged to the one or more image sensors 1608, resulting in significantly lower image contrast. If $\alpha_3$ is greater than the critical angle at the prism/finger interface, the ridges of the fingerprint would not be captured at the one or more image sensors 1608.

For a prism having light striking the inside of the imaging surface, the critical angle of incident light at the boundary between a lower refractive index medium and the prism may be calculated as follows:

$$\Theta c = \arcsin(\text{refractive index of medium/refractive index of prism})$$

For example, if the material of a prism has an index of refraction of 1.50, then:

the critical angle $\Theta c$ at the prism/air interface would be:

$$\Theta c = \arcsin(\text{refractive index of air/refractive index of prism}) = \arcsin(1/1.50) = 41.8°,$$

the critical angle $\Theta c$ at the prism/finger interface would be:

$$\Theta c = \arcsin(\text{refractive index of finger/refractive index of prism}) = \arcsin(1.417/1.50) = 70.9°$$

and, for the present disclosure, $\alpha_1$ can be greater than 41.8°, and $\alpha_3$ can be less than 70.9°.

If a medium having a refractive index greater than that of air and less than that of a finger, such as water, exists outside of the imaging surface, then the imaging region would be shortened due to the higher refractive index of the medium. For example, if the material of a prism has an index of refraction of 1.50, then:

the critical angle $\Theta c$ at the prism/air interface would be:

$$\Theta c = \arcsin(\text{refractive index of air/refractive index of prism}) = \arcsin(1/1.50) = 41.8°,$$

the critical angle $\Theta c$ at the prism/water interface would be:

$$\Theta c = \arcsin(\text{refractive index of water/refractive index of prism}) = \arcsin(1.33/1.50) = 62.5°,$$

and, for the present disclosure, $\alpha_1$ can be greater than 41.8°, and $\alpha_2$ can be less than 62.5° while $\alpha_3$ can be less than 70.9.

In one exemplary approach, if water is applied on the entire surface of the imaging surface and a facsimile of a fingerprint is placed on the prism, for the portion of the imaging surface where a may be smaller than 62.5°, light projected onto the imaging surface would be reflected from the valleys that may be printed in white but absorbed by the ridges that may be printed in black. The light received by the one or more image sensors may generate an image having dark ridges and white valleys just like a real finger in reversed image, but for only that portion of the imaging surface where a may be smaller than 62.5°.

For the portion of the imaging surface where $\alpha_2$ may be greater than 62.5°, light projected onto the imaging surface would pass out of the prism and refract in water. For the dark areas of the facsimile, the refracted light may be fully or partially absorbed and reflected back into the prism. For the white areas of the facsimile, the refracted light would be mostly reflected back into the prism. Any reflected light would re-enter the prism and refract from the imaging surface at angles less than 62.5°. Since there can be substantially no light entering the one or more image sensors at angles greater than 62.5°, the image can appear dark for this portion of the imaging surface. The final image may result with a portion of the facsimile image masked in black.

According to aspects of the present disclosure, the optical structure can be configured so that, for a real fingerprint in air, an entire image may be generated, while for a facsimile of a fingerprint in a liquid having a refractive index greater than that of air and less than that of a finger, only a portion of an image would be generated.

Figure 16B:
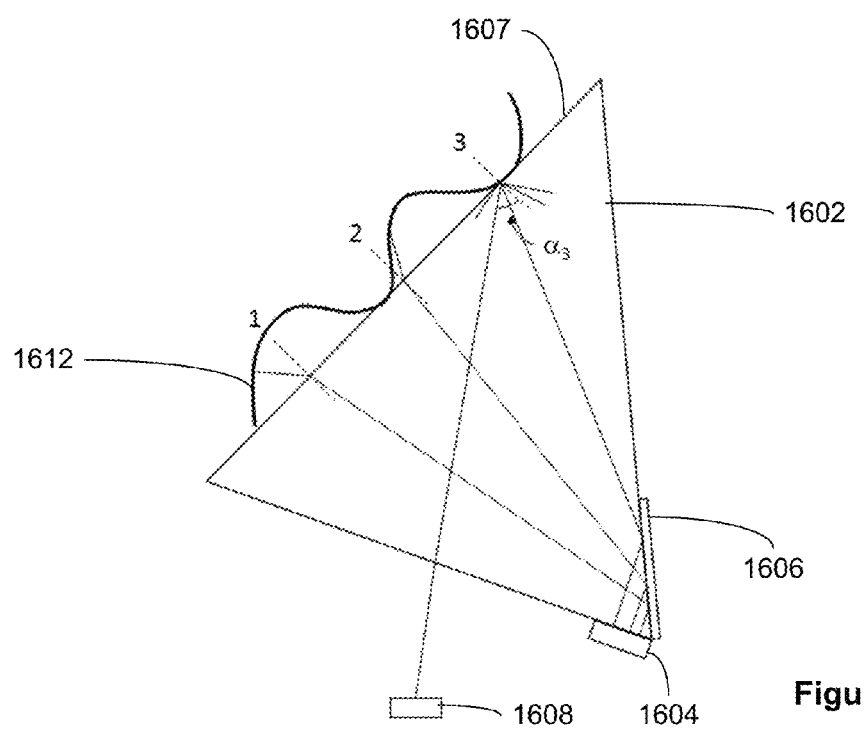
FIG. 16B illustrates a method for detecting fake fingerprint presented as a manufactured finger with a scattering imaging acquisition device according to aspects of the present disclosure.

FIG. 16B illustrates a method for detecting fake fingerprint presented as a manufactured finger with a scattering imaging acquisition device according to aspects of the present disclosure. Note that the apparatus shown in FIG. 16 B can be similar to the apparatus shown in FIG. 16A. It includes a prism 1602, one or more light sources 1604, filter and diffuser 1606, and one or more image sensors 1608. In this example, the apparatus may be configured to detect a manufactured finger 1612 made of a solid material that may touch the imaging surface 1607. According to aspects of the present disclosure, the sold material includes at least one of paper, plastic film, vinyl film, acrylic film, rubber or latex. The approach of detecting the manufactured finger 1612 can be substantially similar to the approach of detecting the printed material 1610 soaked in a liquid as described in association with FIG. 16A above.

Figure 17A:
FIG. 17A illustrates an example of a real fingerprint.

FIG. 17A illustrates an example of a real fingerprint detected by using a scattering imaging acquisition device according to aspects of the present disclosure. In FIG. 17A, an image 1702 of a real finger 1704 is shown.

Figure 17B:
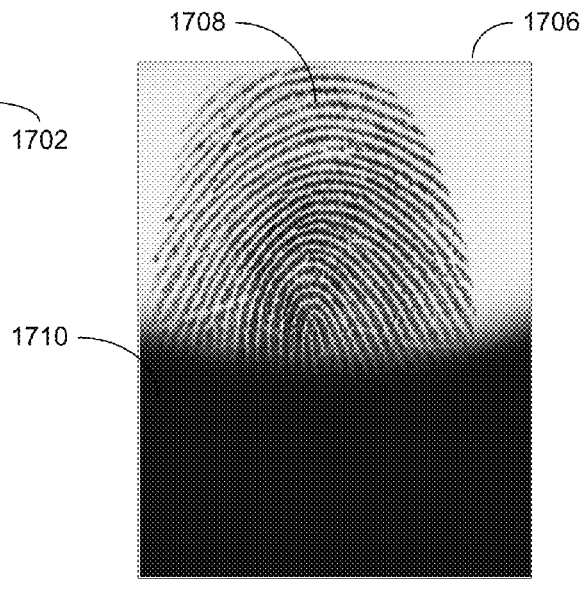
FIG. 17B illustrates an example of a fake fingerprint having a portion of the fingerprint image being masked.

FIG. 17B illustrates an example of a fake fingerprint having a portion of the fingerprint image being masked detected by using a scattering imaging acquisition device according to aspects of the present disclosure. In FIG. 17B, an image 1706 of a fake finger is shown. In particular, the image 1706 of the fake finger may include two image regions, namely a first image region 1708 and a second image region 1710, which can be generated by applying the techniques described above in association with FIG. 16A and FIG. 16B.

Figure 17C:
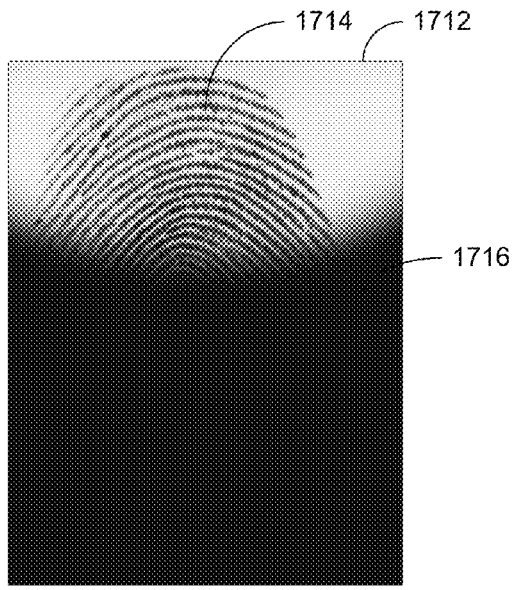
FIG. 17C illustrates another example of a fake fingerprint having a portion of the fingerprint image being masked.

FIG. 17C illustrates another example of a fake fingerprint having a portion of the fingerprint image being masked detected by using a scattering imaging acquisition device according to aspects of the present disclosure. In FIG. 17C, an image 1712 of a fake finger is shown. In particular, the image 1712 of the fake finger may include two image regions, namely a first image region 1714 and a second image region 1716, which can be generated by applying the techniques described above in association with FIG. 16A and FIG. 16B. Note that one of the differences between FIG. 17B and FIG. 17C can be that the area of the first image region 1714 and the second image region 1716 may be varied based on the difference of refractive index of the materials presented in association with the fake finger. This difference is further described below in association with FIG. 18A and FIG. 18B.

Figure 17D:
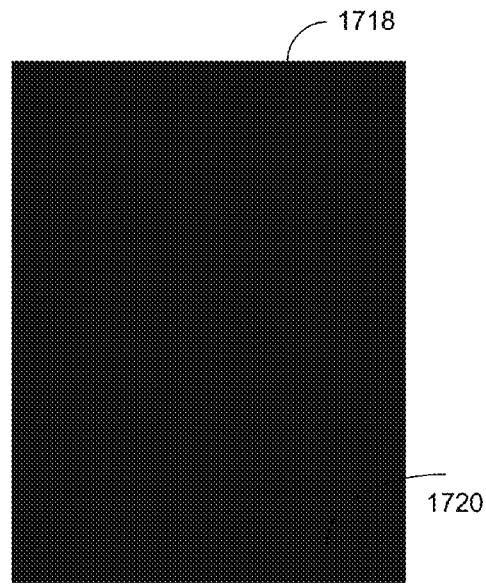
FIG. 17D illustrates yet another example of a fake fingerprint having the entire fingerprint image being masked; detected by using a scattering imaging acquisition device according to aspects of the present disclosure.

FIG. 17D illustrates yet another example of a fake fingerprint having the entire fingerprint image being masked detected by using a scattering imaging acquisition device according to aspects of the present disclosure. In FIG. 17D, an image 1718 of a fake finger is shown. In particular, the image 1718 of the fake finger may include only one image region 1720, which can be generated by applying the techniques described above in association with FIG. 16A and FIG. 16B. Note that one of the differences between FIG. 17D from that of FIG. 17B and FIG. 17C can be that the area of the first image region may be enlarged to cover substantially the entire image 1718. One scenario the area of the first image region may be increased can be that the material presented in association with the fingerprint may have a high refractive index.

As shown in examples FIG. 17A to FIG. 17D, about 100% of the image may be masked when attempting to image fake fingers (as in FIG. 17D), while retaining the capability to produce an entire image of real fingers (as in FIG. 17A). The amount of image that could be masked for fake fingers in a liquid would be a design choice that depends on the application balanced with other factors.

Figure 18A:
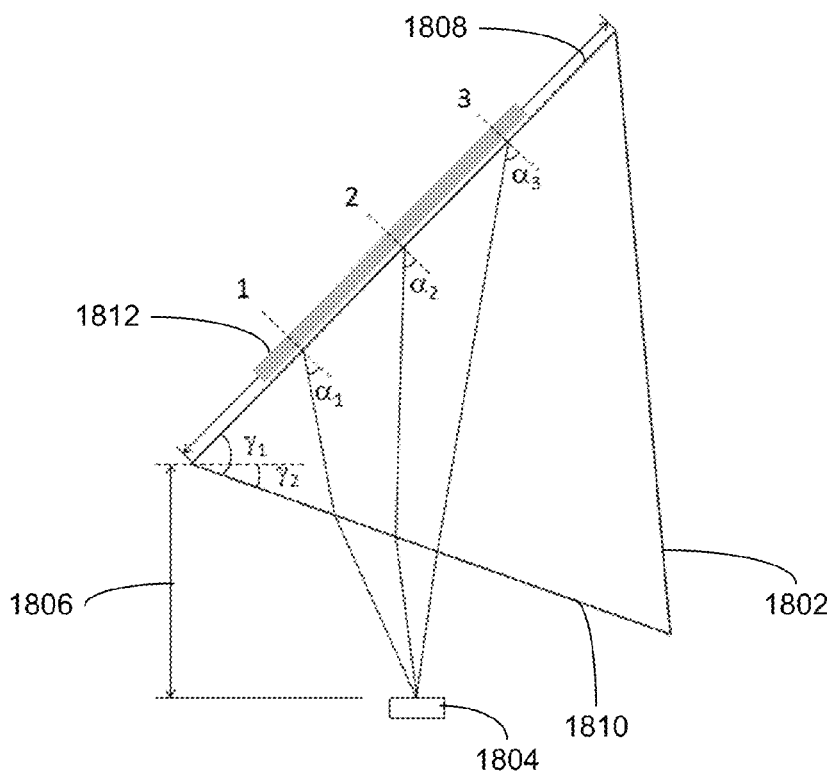
FIG. 18A illustrates an example of capturing different regions of a fingerprint according to aspects of the present disclosure.

FIG. 18A illustrates an example of capturing different regions of a fingerprint according to aspects of the present disclosure. In the example shown in FIG. 18A, an apparatus may include prism 1802, one or more imaging sensors 1804. Prism 1802 may include imaging surface 1808, which may be touched by a material 1812 presented in association with a fingerprint, and a viewing surface 1810. The distance between the prism 1802 and the one or more imaging sensors 1804 can be represented as distance 1806.

In the example of FIG. 18A, it shows how light may travel from the imaging surface 1808, through the viewing surface 1810, and into the one or more image sensors 1804 within the apparatus. Light that may be reflected or refracted from the imaging surface 1808 may be at an angle α with the normal to the imaging surface. The optical structure can be configured so that the one or more image sensors may capture light that has a range of angles α that increases from the edge closest to the viewing surface, to the edge furthest from the viewing surface, such that $\alpha_1 < \alpha_2 < \alpha_3$.

The apparatus may further be configured so that $\alpha_1$ may be greater than the critical angle at the prism/air interface, $\alpha_2$ may be greater than the critical angle at the prism/liquid interface but less than the critical angle at the prism/finger interface, and $\alpha_3$ may be less than the critical angle at the prism/finger interface. The liquid may have a refractive index that may be greater than that of air and less than that of a finger. Examples of such a liquid may include water, having a refractive index of 1.33, and ethanol, having a refractive index of 1.36.

According to aspects of the present disclosure, ambient light coming into the prism through the imaging surface from outside the prism, whether the light may be originated from the surrounding medium or from refracted light exiting the prism and reflecting back into the prism from a reflective object, may reach the one or more image sensors 1804 only from the portion of the imaging surface 1808 where $\alpha_1$ may be less than the critical angle at the prism/air interface. Wherever $\alpha_1$ may be greater than the critical angle at the prism/air interface, no ambient light may reach the One or more image sensors.

In a particular embodiment, if water is applied on the imaging surface 1808, ambient light may reach the one or more image sensors from the region where a may be less than the critical angle at the prism/air interface. Ambient light may also reach the one or more image sensors 1804 from the portion where α may be greater than the critical angle at the prism/air interface but less than the critical angle at the prism/water interface. However, ambient light may not reach the one or more image sensors from the region where a may be greater than the critical angle at the prism/water interface. For an absorption type of fingerprint acquisition device, the portion greater than the critical angle at the prism/water interface may appear white. For a scattering type of device, the same portion may appear dark.

Figure 18B:
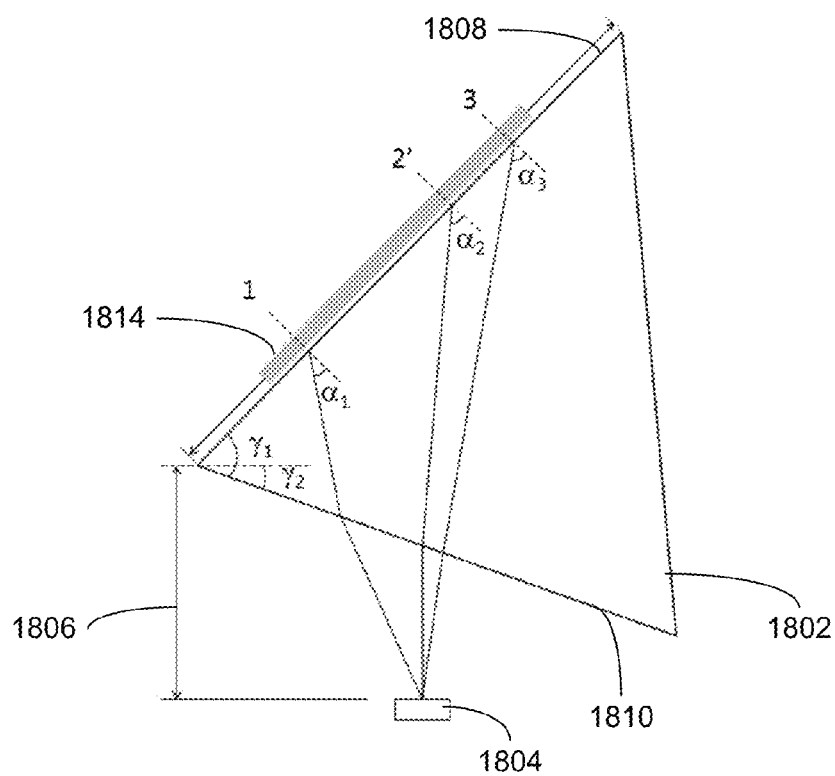
FIG. 18B illustrates another example of capturing different regions of a fingerprint according to aspects of the present disclosure.

FIG. 18B illustrates another example of capturing different regions of a fingerprint according to aspects of the present disclosure. Note that the example shown in FIG. 18B can be substantially similar to the example shown in FIG. 18A. In FIG. 18B, an apparatus may include prism 1802, one or more imaging sensors 1804. Prism 1802 may include imaging surface 1808, which may be touched by a different material 1814 presented in association with a fingerprint, and a viewing surface 1810. The distance between the prism 1802 and the one or more imaging sensors 1804 can be represented as distance 1806. Due to the different material 1814 presented in association with the fingerprint, it may have a different refractive index compared to the material 1812 presented in FIG. 18A. As a result, the corresponding image region may be changed, which can be shown as point 2 in FIG. 18A may have been moved to point 2' in FIG. 18B.

Figure 19:
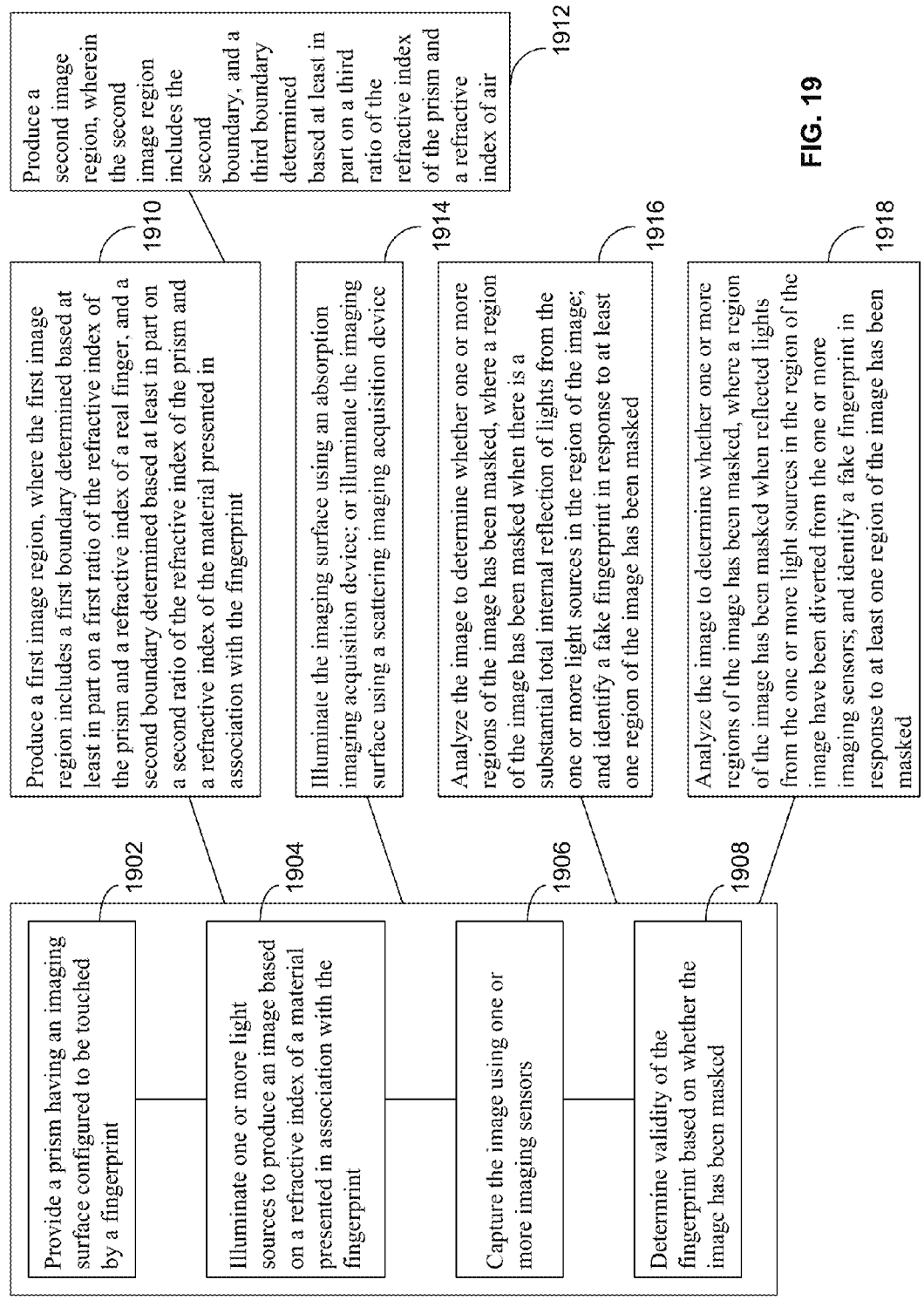
FIG. 19 illustrates a method of detecting fake fingerprint according to aspects of the present disclosure.

FIG. 19 illustrates a method of detecting fake fingerprint according to aspects of the present disclosure. In the exemplary implementation of FIG. 19, in block 1902, the method provides a prism having an imaging surface configured to be touched by a fingerprint. In block 1904, the method illuminates one or more light sources to produce an image based on a refractive index of a material presented in association with the fingerprint. In block 1906, the method captures the image using one or more imaging sensors. In block 1908, the method determines validity of the fingerprint based on whether the image has been masked.

Note that the material presented in association with the fingerprint comprises a printed material soaked in a liquid, where the liquid includes at least one of water, saliva, or ethanol; and the printed material includes at least one of paper, plastic film, vinyl film or acrylic film. The material presented in association with the fingerprint further comprises a manufactured finger made of a solid material, where the solid material includes at least one of rubber, silicone, gelatin or latex.

In block 1910, the method produces a first image region, where the first image region includes a first boundary determined based at least in part on a first ratio of the refractive index of the prism and a refractive index of a real finger, and a second boundary determined based at least in part on a second ratio of the refractive index of the prism and a refractive index of the material presented in association with the fingerprint. In block 1912, the method produces a second image region, where the second image region includes the second boundary, and a third boundary determined based at least in part on a third ratio of the refractive index of the prism and a refractive index of air.

In block 1914, the method illuminates the imaging surface using an absorption imaging acquisition device or illuminates the imaging surface using a scattering imaging acquisition device.

In block 1916, the method analyzes the image to determine whether one or more regions of the image has been masked, where a region of the image has been masked when there is a substantial total internal reflection of lights from the one or more light sources in the region of the image; and identifies a fake fingerprint in response to at least one region of the image has been masked.

In block 1918, the method analyzes the image to determine whether one or more regions of the image has been masked, where a region of the image has been masked when reflected lights from the one or more light sources in the region of the image have been diverted from the one or more imaging sensors; and identifies a fake fingerprint in response to at least one region of the image has been masked.

Figure 20:
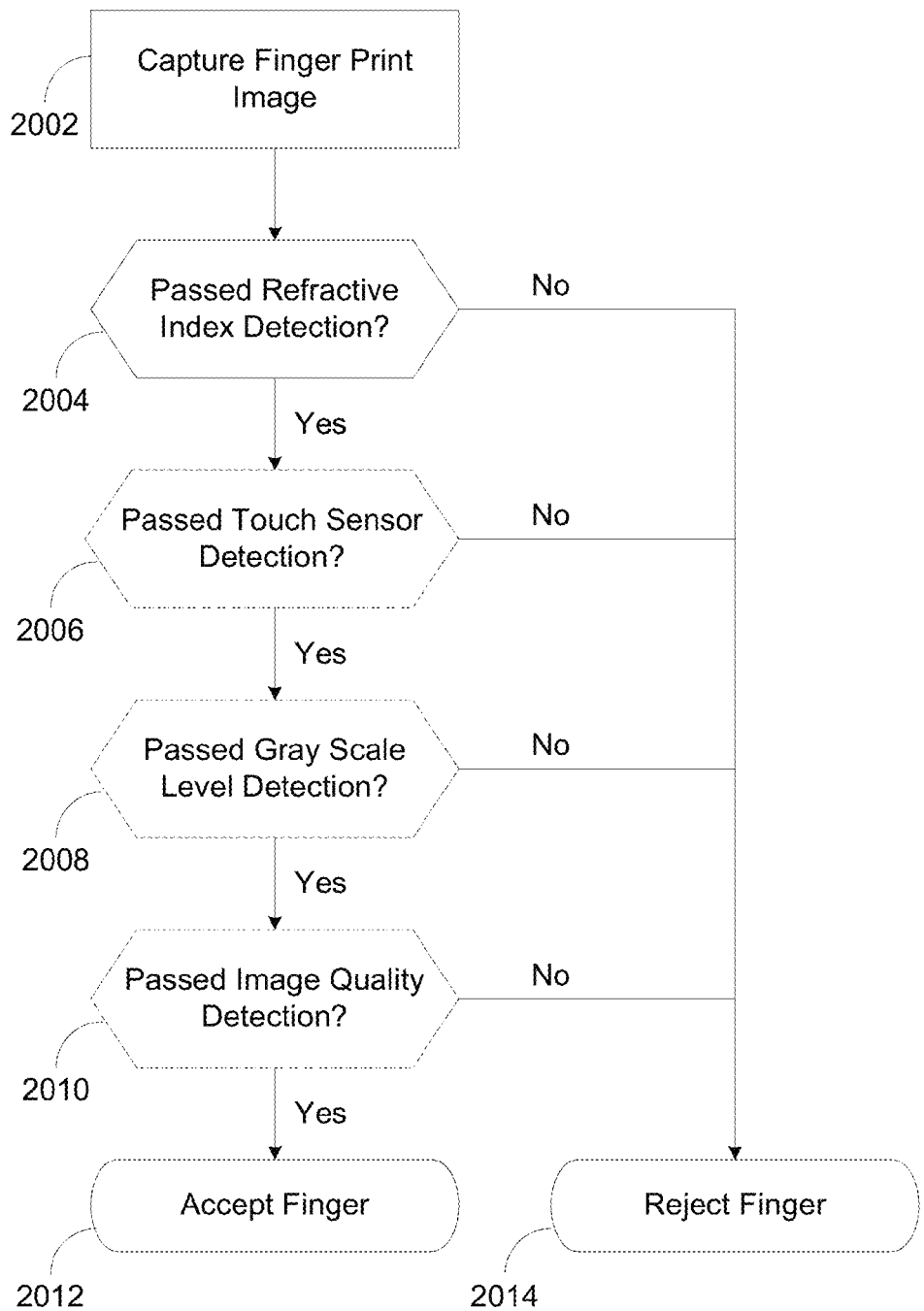
FIG. 20 illustrates an example of detecting fake fingerprint using refractive index method with other fake fingerprint detection methods according to aspects of the present disclosure.

FIG. 20 illustrates an example of detecting fake fingerprint using refractive index method with other fake fingerprint detection methods according to aspects of the present disclosure. In the exemplary flow chart shown in FIG. 20, the fake fingerprint detection method, which is referred to as refractive index detection (test) 2004 as described above in association with FIGS. 14A-B to FIG. 20, may be optionally combined with other detection methods, such as touch sensor detection 2006, gray scale detection 2008, and image quality detection 2010, for example. According to aspects of the present disclosure, touch sensor detection may be described in association with FIG. 1 (see numerals 110 and 112) and its corresponding descriptions. Gray scale detection may be described in association with FIG. 4 (see numerals 412 and 414) and its corresponding descriptions. Image quality detection may be described in association with FIG. 4 (see numerals 416 and 418) and its corresponding descriptions. By comparing the gray levels, rates of pixel variation, and qualities of each image with predetermined threshold values, a system described by the present disclosure would be able to detect fake fingerprints.

According to aspects of the present disclosure, if no fingerprint information is captured in the lower part of the image while a fingerprint image is captured in upper part, it is can be determined as a fake fingerprint by at least one of the above detection methods. The present disclosure may be configured so that the edge of the imaging surface furthest away from the viewing surface is placed closer to the user, so that it would ensure that a real finger may touch the lower part of the imaging surface and not trigger a false determination of an attempt to use a fake finger.

In the particular embodiment shown in FIG. 20, in block 2002, the method captures a fingerprint image. In block 2004, the method applies the refractive index detection test to determine the validity of the fingerprint image. If the fingerprint image does not pass the refractive index detection test (2004_No), the method moves to block 2014, where the method rejects the fingerprint image as a representation of a valid finger. If the fingerprint image passes the refractive index detection test (2004_Yes), then the method may move to block 2012 (path not shown), where the method accepts the fingerprint image as a representation of a valid finger. Alternatively/additionally, the method may optionally employ one or more of the touch sensor test 2006, gray scale test 2008, and/or image quality test 2010 (shown as dotted decision blocks). If any one of the optional tests does not pass (2006_No, 2008_No, or 2010_No), the method moves to block 2014, where the method rejects the fingerprint image as a representation of a valid finger. If fingerprint image passes all the optional tests (2006_Yes, 2008_Yes, and 2010_Yes), the method moves to block 2012, where the method accepts the fingerprint image as a representation of a valid finger.

According to exemplary implementations of the present disclosure, the fake fingerprint detection apparatus can be configured to place the one or more image sensors close to the viewing surface to ensure that $\alpha_1$ would be greater than the critical angle at the prism/air interface but less than that at a prism/liquid interface, wherein the index of refraction of the liquid is between that of air and finger, $\alpha_3$ would be less than the critical angle at the prism/finger interface but greater than that at the prism/liquid interface, and the region of imaging surface between $\alpha_1$ and $\alpha_3$ would be large enough to capture an entire fingerprint. One of the benefits is that this configuration allows the device to be shortened and to capture entire images of real fingers while detecting the presence of the most common type of fake fingers made from facsimiles of fingers applied with a liquid such as water. Specifically, using the present disclosure, images of facsimiles of fingers, applied with liquid having refractive index between that of air and finger, that can be partially or entirely masked.

It will be appreciated that the above descriptions for clarity have described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processors or controllers. Hence, references to specific functional units are to be seen as references to suitable means for providing the described functionality rather than indicative of a strict logical or physical structure or organization.

The invention can be implemented in any suitable form, including hardware, software, firmware, or any combination of these. The invention may optionally be implemented partly as computer software running on one or more data processors and/or digital signal processors. The elements and components of an embodiment of the invention may be physically, functionally, and logically implemented in any suitable way. Indeed, the functionality may be implemented in a single unit, in a plurality of units, or as part of other functional units. As such, the invention may be implemented in a single unit or may be physically and functionally distributed between different units and processors.

One skilled in the relevant art will recognize that many possible modifications and combinations of the disclosed embodiments may be used, while still employing the same basic underlying mechanisms and methodologies. The foregoing description, for purposes of explanation, has been written with references to specific embodiments. However, the illustrative discussions above are not intended to be exhaustive or to limit the invention to the precise forms disclosed. Many modifications and variations are possible in view of the above teachings. The embodiments were chosen and described to explain the principles of the invention and their practical applications, and to enable others skilled in the art to best utilize the invention and various embodiments with various modifications as suited to the particular use contemplated.

What is claimed is:

1. A method for determining validity of a fingerprint, comprising:

providing a prism having an imaging surface configured to be touched by the fingerprint;

illuminating one or more light sources to produce an image based on a refractive index of a material presented in association with the fingerprint, wherein the image comprises a first image region of the fingerprint, wherein the first image region includes a first boundary determined based at least in part on a first ratio of a refractive index of the prism and a refractive index of a real finger, and a second boundary determined based at least in part on a second ratio of the refractive index of the prism and the refractive index of the material presented in association with the fingerprint, wherein the first image region extends in one direction from the first boundary to the second boundary according to the refractive index of the material presented in association with the fingerprint;

capturing the image using one or more imaging sensors; and determining validity of the fingerprint based on whether the image has been masked.

2. The method of claim 1, wherein the material presented in association with the fingerprint comprises:

a printed material soaked in a liquid.

3. The method of claim 2, wherein the liquid includes at least one of water, saliva, or ethanol; and the printed material includes at least one of paper, plastic film, vinyl film or acrylic film.

4. The method of claim 1, wherein the material presented in association with the fingerprint comprises a manufactured finger made of a solid material.

5. The method of claim 4, wherein the solid material includes at least one of rubber, silicone, gelatin or latex.

6. The method of claim 1, wherein the image further comprises a second image region, wherein the second image region includes the second boundary, and a third boundary determined based at least in part on a third ratio of the refractive index of the prism and a refractive index of air.

7. The method of claim 1, wherein the illuminating one or more light sources to produce an image further comprises at least one of:

illuminating the imaging surface using an absorption imaging acquisition device; or illuminating the imaging surface using a scattering imaging acquisition device.

8. The method of claim 1, wherein the determining validity of the fingerprint based on whether the image has been masked comprises:

analyzing the image to determine whether one or more regions of the image has been masked, wherein a region of the image has been masked when there is a substantial total internal reflection of lights from the one or more light sources in the region of the image; and identifying a fake fingerprint in response to at least one region of the image has been masked.

9. The method of claim 1, wherein the determining validity of the fingerprint based on whether the image has been masked further comprises:

analyzing the image to determine whether one or more regions of the image has been masked, wherein a region of the image has been masked when reflected lights from the one or more light sources in the region of the image have been diverted from the one or more imaging sensors; and identifying a fake fingerprint in response to at least one region of the image has been masked.

10. An apparatus for determining validity of a fingerprint, comprising:

a prism having an imaging surface configured to be touched by the fingerprint;

one or more light sources configured to produce an image based on a refractive index of a material presented in association with the fingerprint, wherein the image comprises a first image region of the fingerprint, wherein the first image region includes a first boundary determined based at least in part on a first ratio of a refractive index of the prism and a refractive index of a real finger, and a second boundary determined based at least in part on a second ratio of the refractive index of the prism and the refractive index of the material presented in association with the fingerprint, wherein the first image region extends in one direction from the first boundary to the second boundary according to the refractive index of the material presented in association with the fingerprint;

one or more imaging sensors configured to capture the image; and a controller configured to determine validity of the fingerprint based on whether the image has been masked.

11. The apparatus of claim 10, wherein the material presented in association with the fingerprint comprises:

a printed material soaked in a liquid.

12. The apparatus of claim 11, wherein the liquid includes at least one of water, saliva, or ethanol; and the printed material includes at least one of paper, plastic film, vinyl film or acrylic film.

13. The apparatus of claim 10, wherein the material presented in association with the fingerprint comprises a manufactured finger made of a solid material.

14. The apparatus of claim 13, wherein the solid material includes at least one of rubber, silicone, gelatin or latex.

15. The apparatus of claim 10, wherein the image further comprising:

a second image region, wherein the second image region includes the second boundary, and a third boundary determined based at least in part on a third ratio of the refractive index of the prism and a refractive index of air.

16. The apparatus of claim 10, wherein the one or more light sources configured to produce the image comprises at least one of:

an absorption imaging acquisition device configured to illuminate the imaging surface; or a scattering imaging acquisition device configured to illuminate the imaging surface.

17. The apparatus of claim 10, wherein the controller configured to determine validity of the fingerprint based on whether the image has been masked comprises:

logic configured to analyze the image to determine whether one or more regions of the image has been masked, wherein a region of the image has been masked when there is a substantial total internal reflection of lights from the one or more light sources in the region of the image; and logic configured to identify a fake fingerprint in response to at least one region of the image has been masked.

18. The apparatus of claim 10, wherein the controller configured to determine validity of the fingerprint based on whether the image has been masked further comprises:

logic configured to analyze the image to determine whether one or more regions of the image has been masked, wherein a region of the image has been masked when reflected lights from the one or more light sources in the region of the image have been diverted from the one or more imaging sensors; and logic configured to identify a fake fingerprint in response to at least one region of the image has been masked.

* * * * *